US006587583B1

(12) United States Patent
Kurzweil et al.

(10) Patent No.: US 6,587,583 B1
(45) Date of Patent: Jul. 1, 2003

(54) COMPRESSION/DECOMPRESSION ALGORITHM FOR IMAGE DOCUMENTS HAVING TEXT, GRAPHICAL AND COLOR CONTENT

(75) Inventors: Raymond C. Kurzweil, Newton, MA (US); Kenneth M. MacKenzie, Arlington, MA (US); Mark S. Dionne, Newton, MA (US)

(73) Assignee: Kurzweil Educational Systems, Inc., Bedford, MA (US)

( * ) Notice: Subject to any disclaimer, the term of this patent is extended or adjusted under 35 U.S.C. 154(b) by 0 days.

(21) Appl. No.: 09/398,392

(22) Filed: Sep. 17, 1999

(51) Int. Cl.[7] .................................................. G06K 9/00
(52) U.S. Cl. ........................ 382/164; 382/176; 382/166; 382/239; 358/462
(58) Field of Search .............................. 382/166, 164, 382/171, 172, 174, 175, 179, 198, 290, 292, 296, 299, 176, 298, 301, 240; 358/462

(56) References Cited

U.S. PATENT DOCUMENTS

| | | | |
|---|---|---|---|
| 4,406,626 A | * | 9/1983 | Anderson et al. ............ 434/169 |
| 5,619,594 A | * | 4/1997 | Melen .......................... 382/233 |
| 5,668,646 A | * | 9/1997 | Katayama et al. ........... 358/530 |
| 5,778,092 A | * | 7/1998 | MacLeod et al. ....... 358/426.04 |
| 5,787,414 A | | 7/1998 | Miike et al. ..................... 707/2 |
| 5,809,167 A | * | 9/1998 | Al-Hussein .................. 382/176 |
| 6,275,301 B1 | * | 8/2001 | Bobrow et al. ............... 358/1.1 |
| 6,396,593 B1 | * | 5/2002 | Laverty et al. .............. 358/1.13 |

OTHER PUBLICATIONS

Jantz, R., "Pagis Pro 97: A Scanning Secret Weapon", *1997 PC World Communications* (from the WorldWideWeb).

"Pagis Pro 97: A Scanning Secret Weapon", 1997 PC World Communications (from WorldWideWeb), 17 pgs.

* cited by examiner

*Primary Examiner*—Bhavesh M. Mehta
*Assistant Examiner*—Ali Bayat
(74) *Attorney, Agent, or Firm*—Fish & Richardson P.C.

(57) ABSTRACT

A computer program product for compressing data files representative of an image document. The document includes color information and/or graphical information. The product is on a computer readable medium and includes instructions for causing a computer to provide a first image file at a first resolution and a second image file at a second resolution of said document with said second resolution being lower than said first resolution. The product causes a computer to process the first image file to convert the first image file into a text file representation of the document and compress the text file representation of the document to provide a first compressed file. The computer processes the second file to extract information corresponding to color information and graphics information. It compresses the second file using a second, different compression technique to provide a second compressed file corresponding to the image and the color information from the low resolution image file. The product causes a computer to store said first and second compressed files to provide a composite file corresponding to the compressed file of the document.

7 Claims, 30 Drawing Sheets

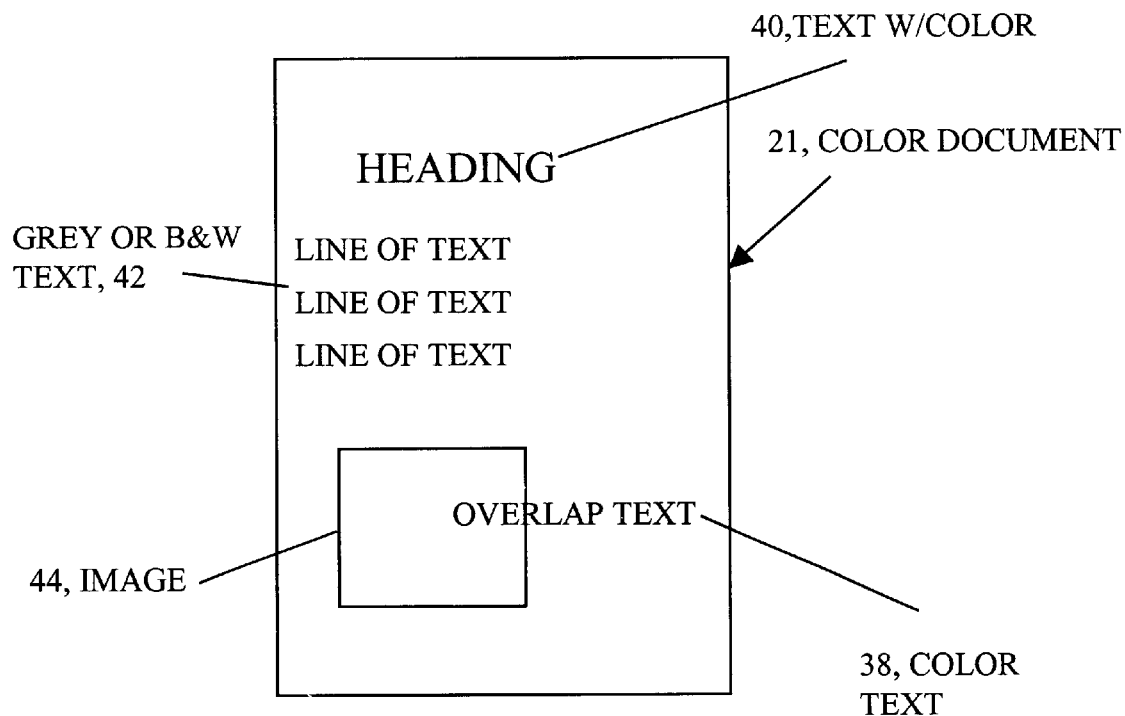
FIG. 3A
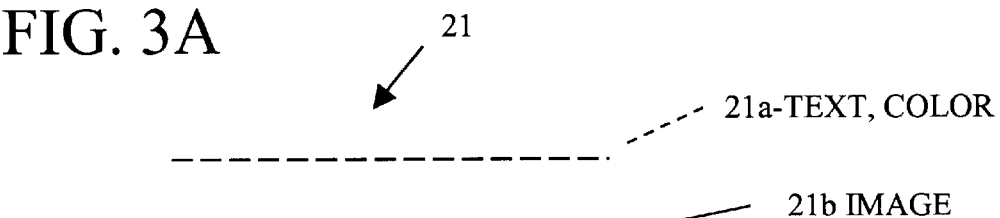
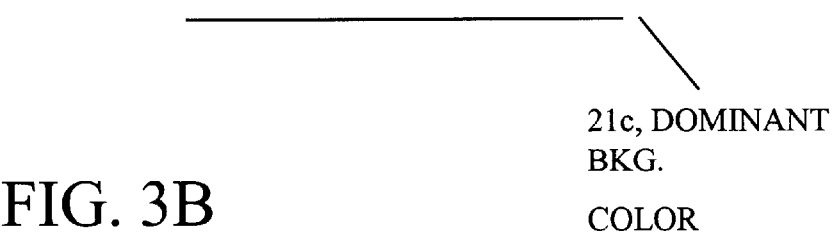
FIG. 3B

| BLOCK | FOREGROUND COLOR | BACKGROUND COLOR | NO. PEAKS |
|---|---|---|---|
|  |  |  |  |
|  |  |  |  |
|  |  |  |  |

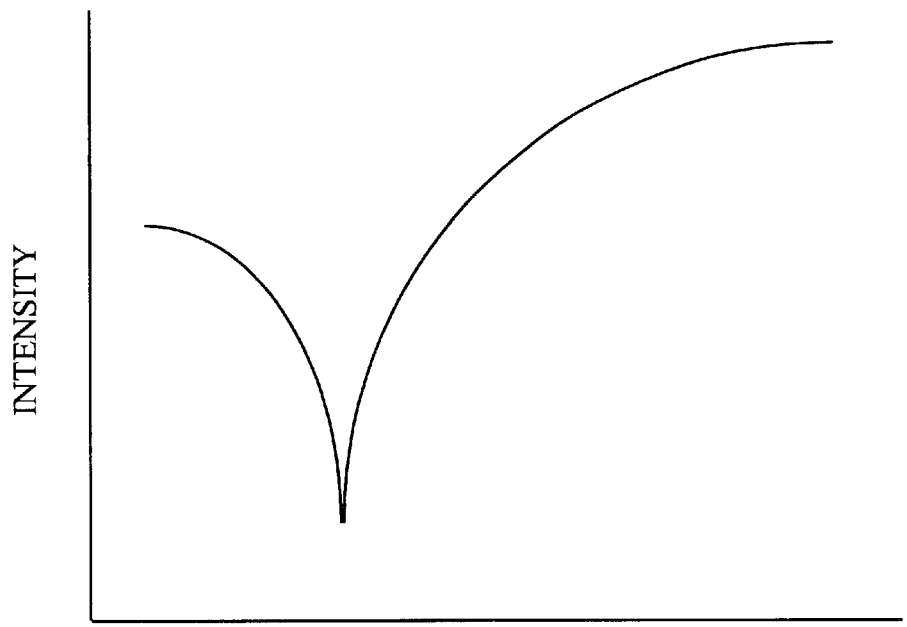
FIG. 11A   DISTANCE FROM REFERENCE
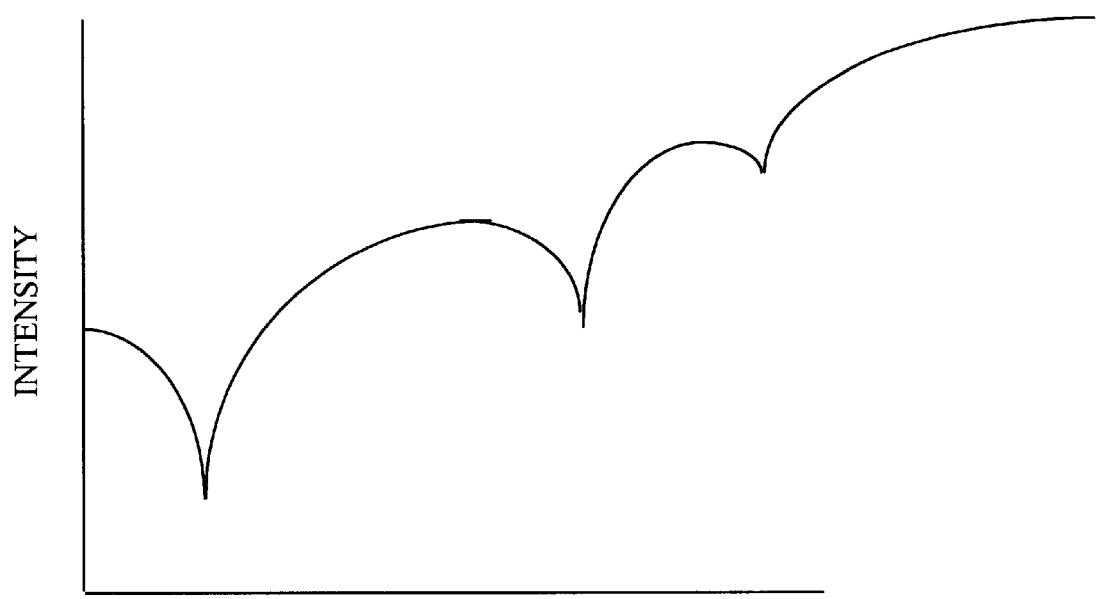
DISTANCE FORM REFERENCE
FIG. 11B

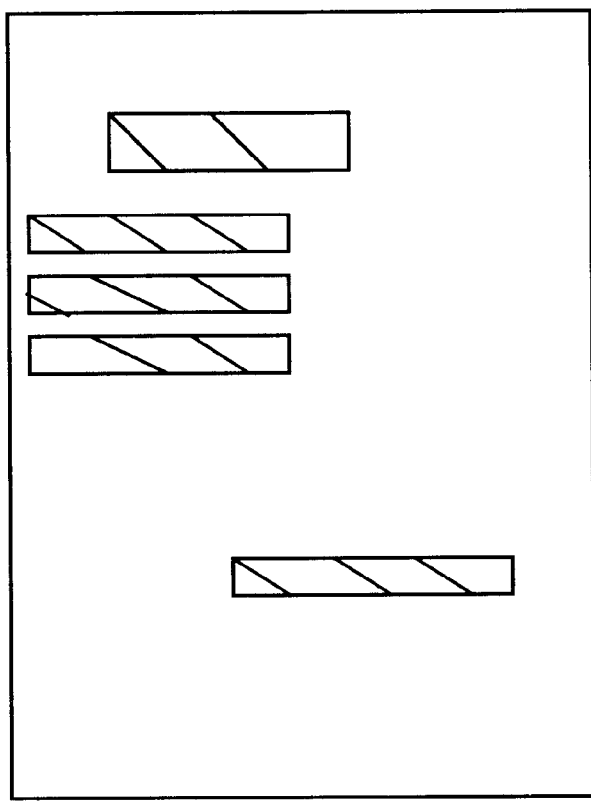
FIG. 12A — 97, OCR MASK,
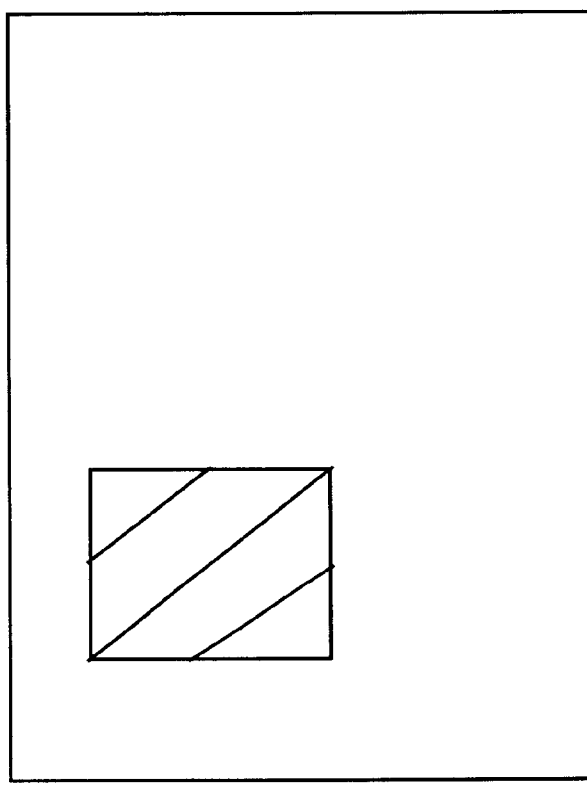
FIG. 12B — 98, IMAGE MASK

99, TEXT MASK,

99a, TEXT LIFTING MASK

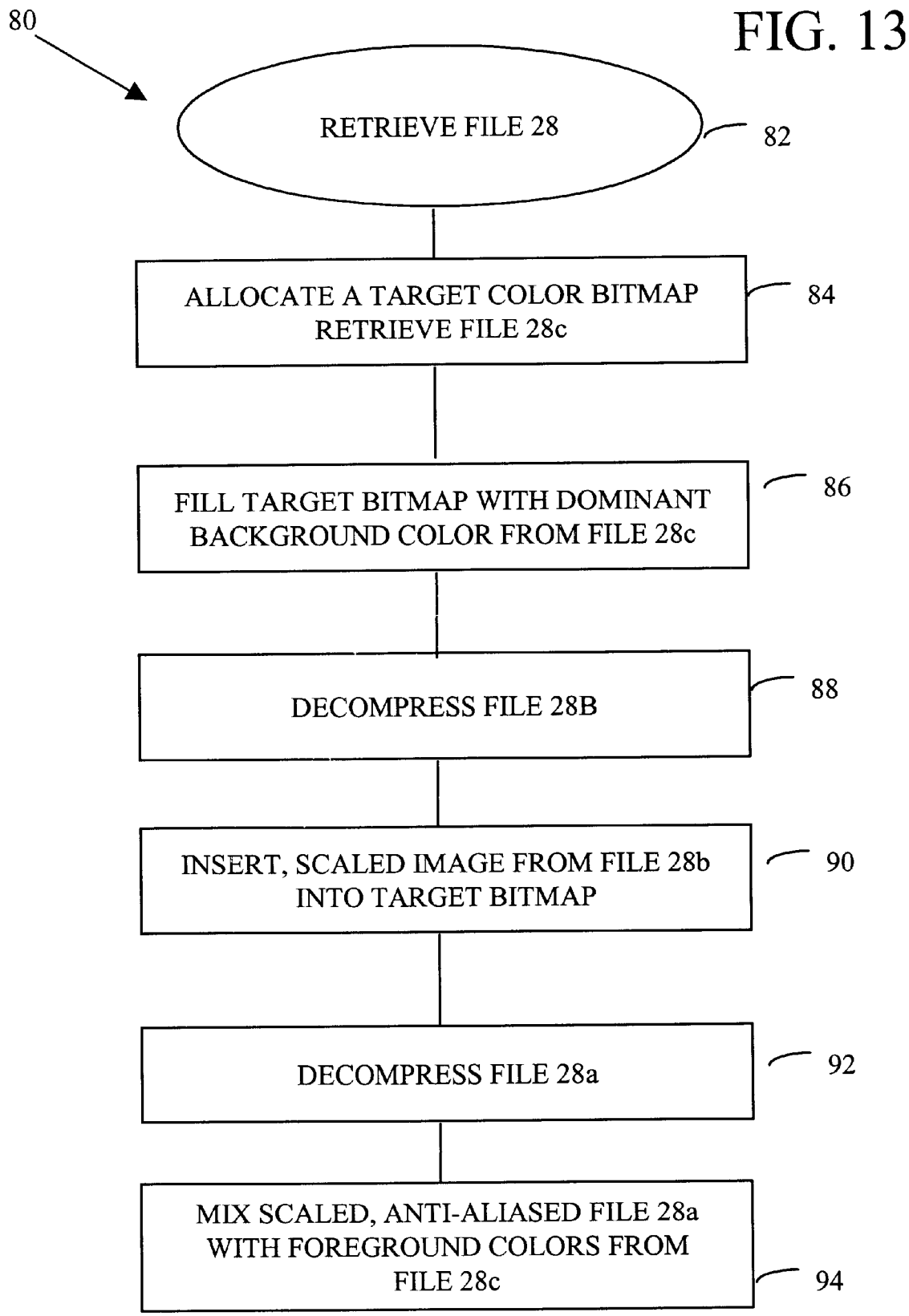

COMPRESSION/DECOMPRESSION ALGORITHM FOR IMAGE DOCUMENTS HAVING TEXT, GRAPHICAL AND COLOR CONTENT

BACKGROUND

This invention relates to software executed on computer systems for displaying and storing image representations of documents.

Computer systems are often used to display an image representation of a scanned document such as a scanned page from a book, magazine and so forth. Such documents can contain text, colorized text and graphical or image content. Such documents are also stored as files on a storage media of the computer system. One problem associated with storing such files is that the size of the file is often large because of the color and image information.

Another problem encountered with displaying images of documents is the so-called "crease" problem. When a book is scanned the spine portion of the book will often produce shadows. Shadowing produces a crease or visually displeasing portion when the image is displayed. The presence of the crease is also undesirable for compression of the document since it can be confused with text or graphics and will in any event increase the size of the compressed file corresponding to the document.

Also specialized computer systems, so-called reading machines, have been used to improve the educational attainment of individuals with learning disabilities. These reading machines which are typically general purpose or PC-based computers include specialized software that enable the reading machine to read selected text aloud to a user of the machine. Such specialized software processes and inputs source documents and generates synthetic speech to enable the user to read through the document a word, line, sentence, etc. at a time. These reading machines include a scanner to provide one technique to input source documents to the user.

SUMMARY

One aspect of the invention is a computer program product for compressing data files representative of an image document. The document includes color information and/or graphical information. The product is on a computer readable medium and includes instructions for causing a computer to provide a first image file at a first resolution and a second image file at a second resolution of said document with said second resolution being lower than said first resolution. The product causes a computer to process the first image file to convert the first image file into a text file representation of the document and compress the text file representation of the document to provide a first compressed file. The computer processes the second file to extract information corresponding to color information and graphics information. It compresses the second file using a second, different compression technique to provide a second compressed file corresponding to the image and the color information from the low resolution image file. The product causes a computer to store said first and second compressed files to provide a composite file corresponding to the compressed file of the document.

One or more advantages are provided by the compression algorithm that can compresses portions of the document separately. This approach takes advantage of the different requirements needed for compression of text and image containing documents. For the documents containing text, particularly when used with optical character recognition software, a high resolution scan and lossless or near lossless compression technique are necessary to provide a useful representation of the document. However, using a high resolution scan and lossless compression technique to operate on the image portions of a document would be highly wasteful in that the image portions of the document would substantially and unnecessarily (for many instances) increase the file size associated with the stored document. Therefore, by providing separate graphical processing of the document with OCR text processing of the document, it is possible to satisfactorily compress the image or graphical portions of the document in a manner which provides a compressed image file having a minimal size file for image portions of the document while providing a file which maintains a high resolution, near lossless compression of text portions of the document.

In another aspect of the invention, a computer program product operable to determine a dominant background color associated with an image representation of a document containing color and text information includes instructions for causing a computer to retrieve background color information associating a background color with each one of a plurality of samples of pixels representing the document and filter the background colors to provide a target number of colors to represent the background colors. The product causes the computer to apply a median cut analysis on the background color samples to filter said background samples into one of a plurality of boxes corresponding to said target number of colors, and sort boxes by volume and intensity the to determine the dominant background color as a color to represent the background of the document by the box having the highest intensity.

DESCRIPTION OF THE DRAWINGS

The foregoing features and other aspects of the invention will be more fully understood when described in conjunction with the accompanying drawings, in which:

FIG. 3A is a diagrammatical view of a typical document including text, colorized text and image or graphical content;

FIG. 3B is a diagrammatical view of a model of the document shown in FIG. 3A;

FIG. 8 is a schematic depiction of a data structure showing foreground and background color data;

FIG. 11A is a plot of intensity vs. pixels distance useful in understanding the crease removal process of FIGS. 9A, 9B and 10;

FIG. 11B is a plot of intensity vs. pixels for application of the crease removal algorithm of FIGS. 9A, 9B and 10 over three sections of a scanned document;

FIGS. 12A–12D are diagrammatical representations of OCR text, image, text, and textlift masks;

FIG. 13 is a flow chart showing steps used to decompress a file compressed using the algorithm set forth above;

DETAILED DESCRIPTION

Figure 1:
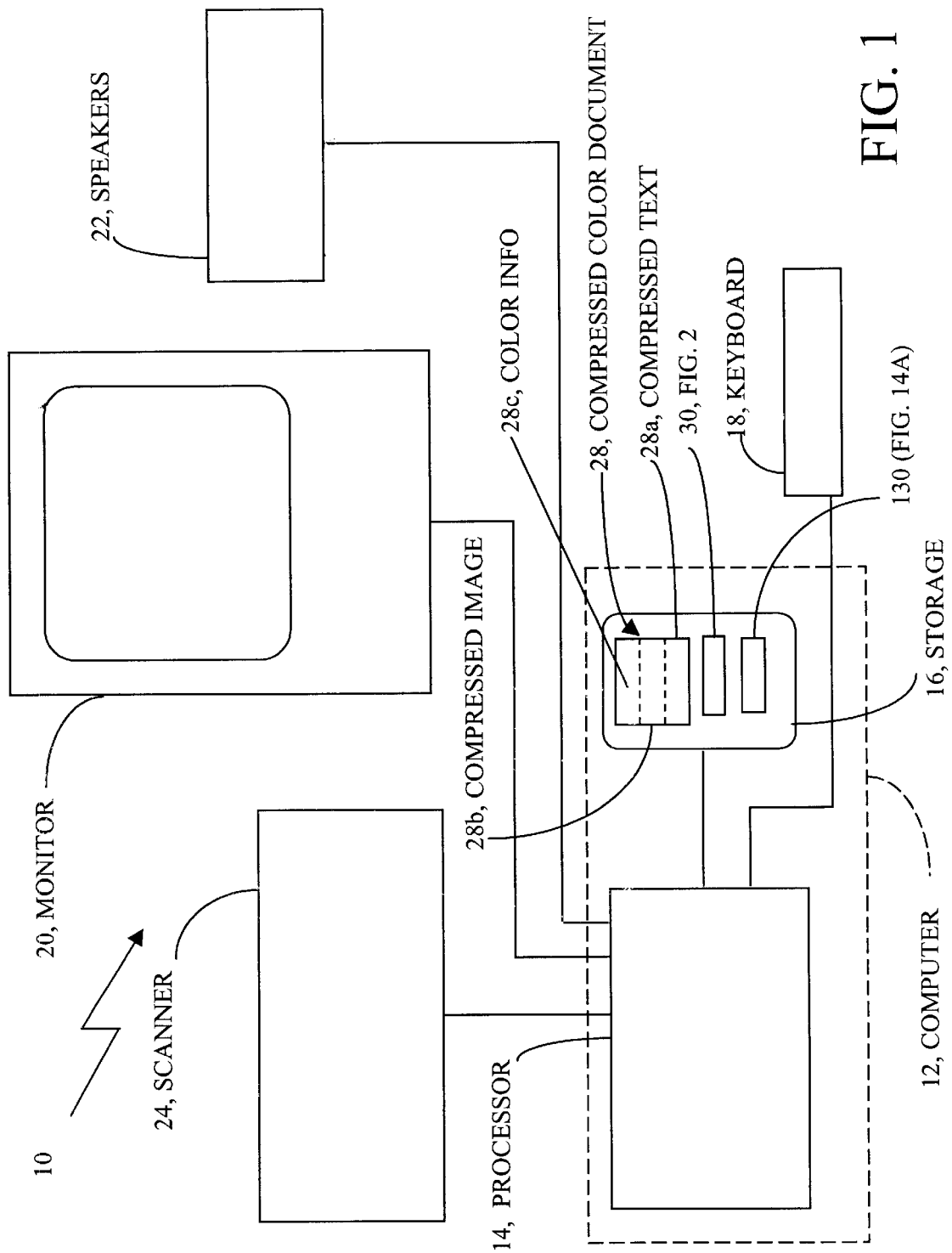
FIG. 1 is a block diagram of a computer system incorporating a scanner.

Referring now to FIG. 1, a computer system 10 is shown. The computer system 10 is a general purpose computer system typically a personal computer type system. The system performs various functions such as word processing and display of images of stored, documents having text, colorized text and/or graphical content.

A preferred embodiment of the computer system 10 is a reading machine 10' as will be further described in conjunction with FIG. 14.

Suffice it here to say that the computer system 10 includes a computer 12 comprised of a central processing unit (not shown) that is part of a processor 14. The preferred implementation of the processor 14 is a Pentium-based system from Intel Corporation, Santa Clara, Calif. although other known processor implementations could alternatively be used. In addition to the CPU (not shown), the processor includes main memory, cache memory and bus interface circuits (not shown). The computer system 12 includes a mass storage element 16 the hard drive associated with personal computer systems. The computer system 10 further includes a PC-type keyboard, a sound card, a monitor (preferably color), as well as speakers 22. In addition, the computer includes a pointing device such as a mouse, and a scanner 24. The components are coupled to the computer system via a bus and appropriate bus interfaces and software drivers, not shown. The computer system 12 here operates under a WindowsNT™ Microsoft Corp. operating system although other operating systems could alternatively be used.

Resident on the mass storage element 16 is image processing software 30 (FIG. 2) and/or 130 (FIG. 14A) used to control display, and compression/decompression of a scanned image. The image processing software 130 is used when the computer system 10 functions as a reading machine, as will be described in conjunction with FIGS. 14A–22.

The storage device 16 has a file 28 which contains a compressed representation of a scanned document having text, colorized text and/or image or graphical content. The file 28 is comprised of portions 28a–28c which represent, respectfully, the text portion of the document (28a), the image portion (28b) and color information (28c).

The compression/decompression software 30 takes an input document from scanner 24 or other input media such as a bit-mapped representation and compresses the information contained in the document into the compressed file 28. In addition, the software 30 decompresses the compressed file 28 and provides a representation of the scanned document on the monitor 20 when requested by a user of the system 10.

Figure 2:
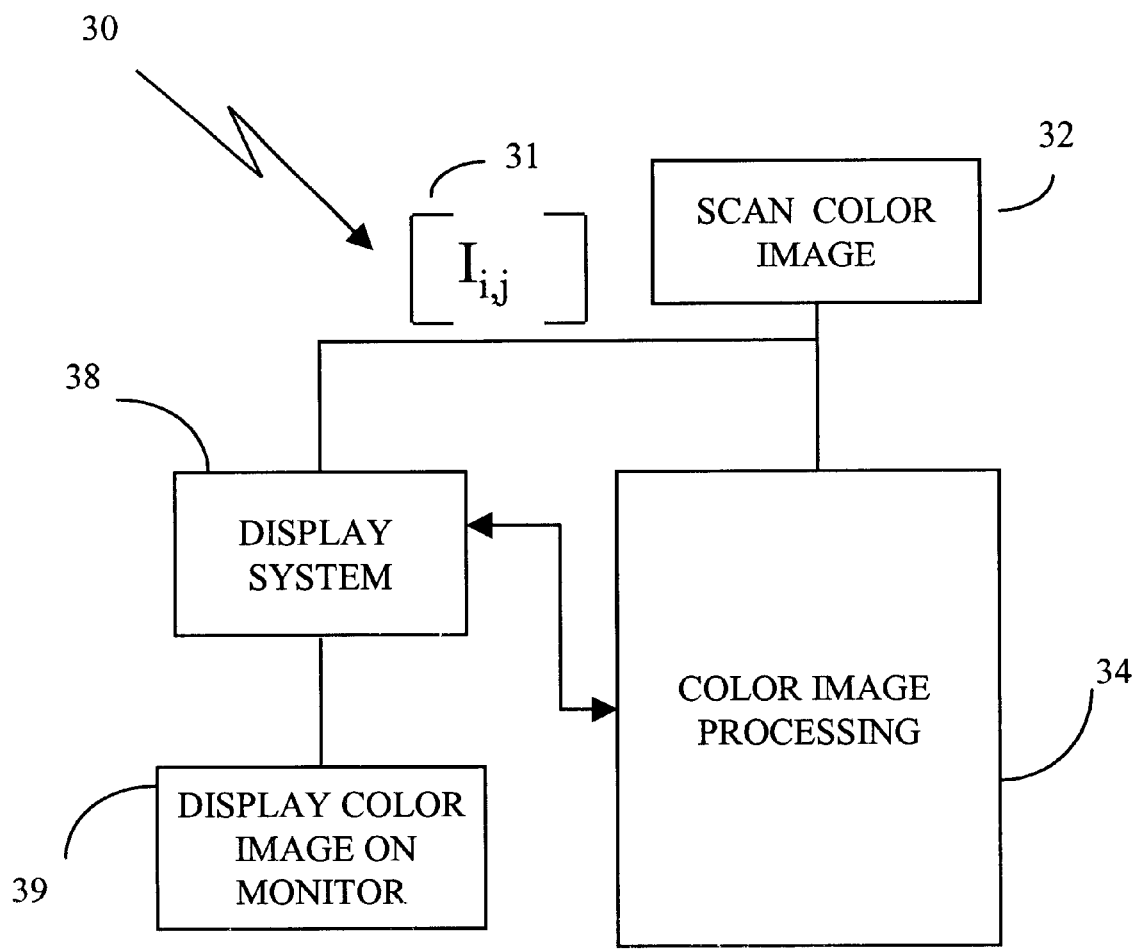
FIG. 2 is a flow chart showing steps used in displaying and compressing a scanned image representation of a color document for use in the computer system of FIG. 1.

Referring now to FIG. 2, the software 30 processes a color document. The software 30 scans an input document containing color information, graphical content information and text to provide an image file 31. The image file 31 can be sent to a display system 38 for display on the monitor 39. The process 30 also includes color image processing software 34 that converts the image file into optical character recognition (OCR) text (not shown) and compresses the file into a format which is more readily stored on the mass storage device 16. In addition, as scanned this image file may include undesirable features such as creases. Below is described as part of the process 34 a technique to remove such creases which can be used independent of the techniques used to compress the file. In addition, it will be appreciated that a stored, compressed and/or crease filtered version of the file 31 can alternatively be used as the displayed representation once the processing as will be described below is completed.

Referring now to FIGS. 3A and 3B, a typical color document 21 is illustrated. The document 21 includes a header 40 which here may be black on a white background or a color. In addition, the document 21 includes a plurality here three "lines of text" which may be black on a white background or a color. The document typically also has a graphical content section 44 which may be a picture, graph or other graphical type of content information as known, and may be in color or black and white. The document has overlapping text section 38 which is text depicted in a color or black and white. The overlapping section 38 overlaps the image section 44 and the text section of the document 21.

The above-described document 21 can be modeled as comprising three levels, as shown in FIG. 3B. The first level 21a represented by the dashed line 21a represents the text information on the document 21 whether illustrated by a color or black. That is, for example, the "line of text" and "header" sections of document 21 (FIG. 3A) can be represented by a black and white image and a color associated with each one of a plurality of samples of the page. Here, as will be described, 0.1 inch square samples of the black and white image are used. Alternatively, sections of document 21 (FIG. 3A) can be represented by an OCR conversion with color information being applied to the converted text as appropriate in accordance with the original document. The second level 21b is represented in the graphical section 44 or that part of the image which represents the portion of the document that contains the graphical information, whether in color or black and white. The final level 21c of the document is the dominant background color which corresponds to the color which best represents a color that predominates over the surface of the color document.

By modeling the color document 21 in this manner to include these three distinct levels, it is possible to develop a compression algorithm which can handle portions of the document separately in a manner as will now be described.

Figure 4A:
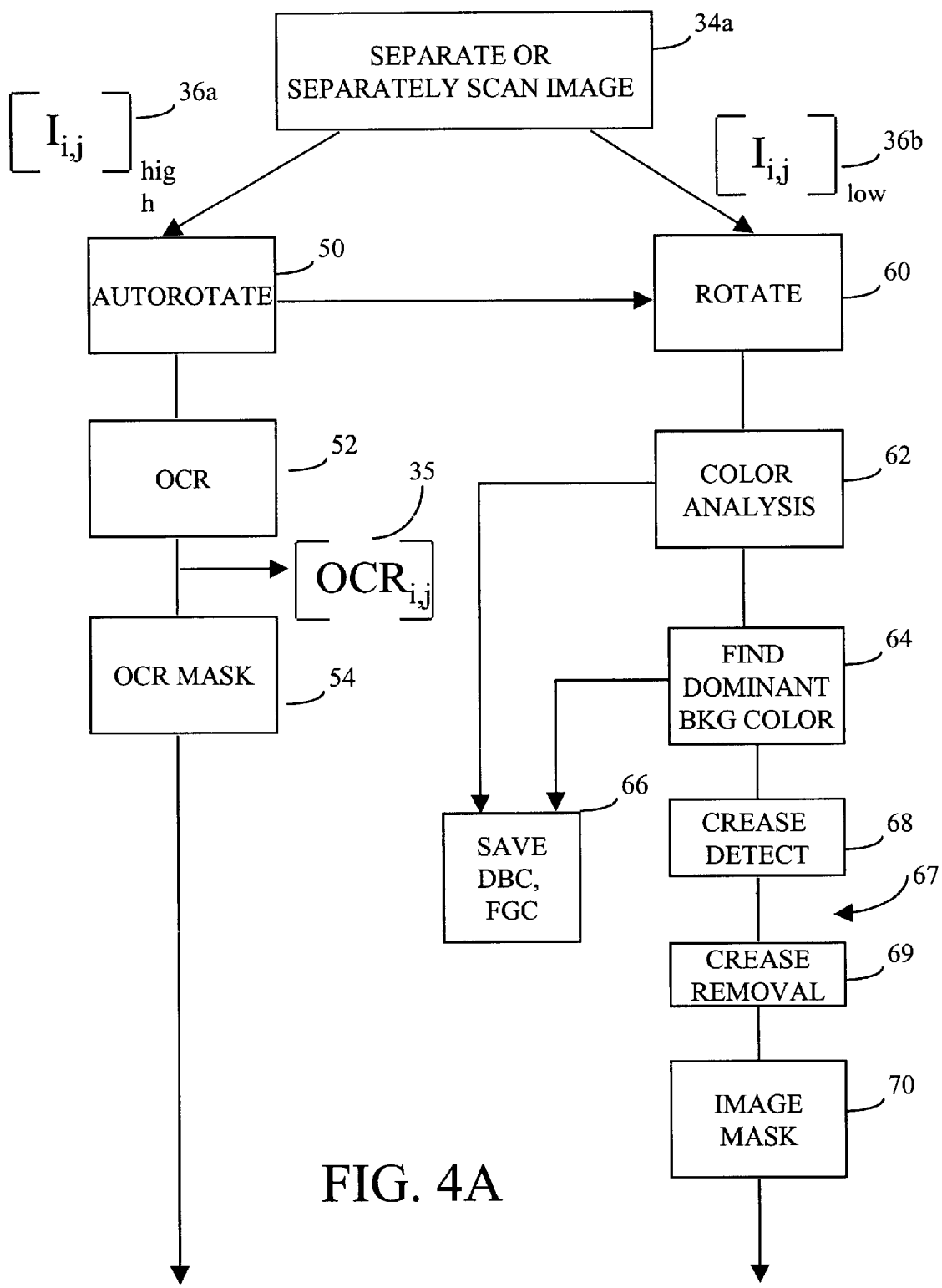
FIGS. 4A and 4B are flow charts showing steps used in compressing and decompressing a file corresponding to a scanned color image of a color document.

Referring now to FIG. 4A, the steps 34 used in processing the color image to separate text, image and color information and to store the information in separate text and color/graphic content files is shown.

Preferably, a low resolution scan of the image is provided or, alternatively, a low resolution image file is separated from a high resolution image scan of a document. In either event, a low resolution file is processed to identify colors associated with the document, a dominant background color and the location of the graphical portion of the document. This information is used to reduce the size of the low resolution image file to correspond to those portions of the file containing the image or graphical portion of the document and to provide a file corresponding to the color information associated with the document.

The process 34 includes the step of separate scans 34a of the image to produce a file 36a at a high resolution in black and white and a file 36b at a low resolution in color. Alternatively, a high resolution scan can be performed and the scan separated into high resolution image and low resolution image files 36a, 36b. Separate high and low resolution image files 36a, 36b are provided in order to take advantage of certain characteristics of such documents. The high resolution image file 36a provided from step 36 is operated on by an "auto-orient+deskew" process at step 50. In this auto-orient+deskew step 50, the B/W image is inspected, then automatically rotated at an angle to a canonical up-is-up orientation for best OCR performance (and best viewing). A "rotate" step 60 applies the same angle of rotation to the color image so that the resulting pair of image (B/W and color) continue to match. The angle information is passed from the auto-orient+deskew step to the rotate step 60 via the line labeled "angle".

The auto-orient/deskew pair of operations is conventionally found in any application that makes use of OCR. In auto-orientation, the bitmap of the image is rotated by a multiple of 90 degrees so that the letters are right side up for reading by the OCR software. Deskew is a small rotation, less than+/−10 degrees, used to better align letters on the page in straight horizontal lines, for the benefit of the OCR software. The corrected image file (not shown) is processed by the OCR software at step 52. The OCR software uses conventional optical character recognition techniques on the image data provided from the scanned image to produce an output data structure 35.

The output data structure 35 which will be further discussed in conjunction with FIGS. 17–20 includes information corresponding to the text information or the OCR converted text as well as positional and size information associated with the particular text elements. The positional and size information associates its text elements to its location in the image representation of the document.

An OCR mask is generated in step 54 using OCR positional information in data structure 35. The OCR mask as illustrated in FIG. 12A represents regions of the image containing text recognized by OCR software. The OCR mask is included to insure that regions containing text are always saved as part of the black and white image file 21a regardless of content classification decisions made about the image as described in conjunction with step 70 below.

Figure 12C:
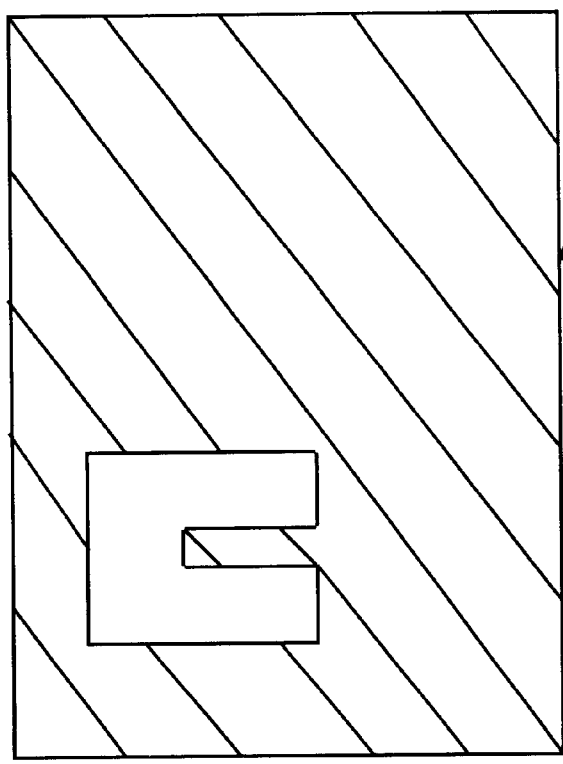

At step 56 (FIG. 4B), the OCR mask from step 54 and the image mask (FIG. 12B) from step 70 described below are applied to the black and white image 36a. Step 56 eliminates regions corresponding to graphical or picture content from the black and white image file 21a. In step 56, a text mask, illustrated by FIG. 12C is computed by the bitwise logical operation:

text mask=OCR mask OR NOT image mask

Bits set in the text mask represent regions of black and white image file 36a to be saved in the black and white image file 21a. The text mask is then applied to the black and white image file 36a.

At step 58 standard text compression techniques are used to compress the black and white text file 21a from step 52 into file 28a which can be stored on storage element 16. One preferred compression technique is a somewhat lossy technique, the so-called CPC technique or "Cartesian Perceptual Compression technique" used for compressing of .tif files, fax type files and so forth. CCITT Group 4 is an alternative compression scheme that could be used in place of CPC.

Figure 4B:
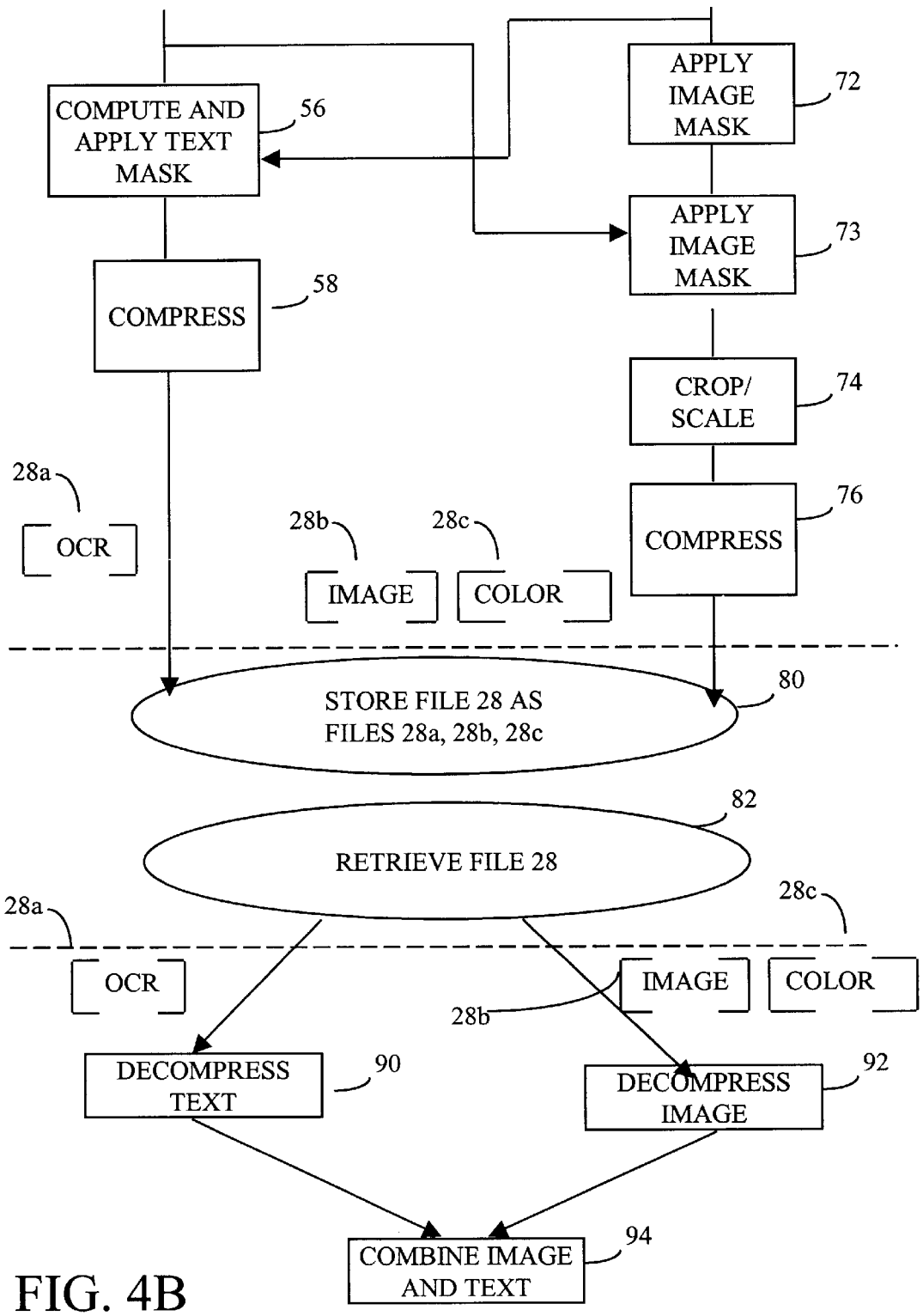

Still referring to FIGS. 4A and 4B, the low resolution image file 36b is operated on by the rotate transformation process at step 60 which is used to correct the image using the angle information supplied by step 50. The corrected image file from step 60 is fed to a color analysis step 62 to determine foreground colors of the colorized text. At step 64 the image file 36b and information provided for the color analysis step are used to determine a dominant background color for the page. Both steps 62 and 64 will be further described below. The foreground colors and dominant background color are saved at step 66. In addition, having found color information concerning the page, the image file 36b is fed to a crease filter 67 to detect a crease at step 68 and to remove the detected crease at step 69 from the image file data that causes the display of undesired shadows on the image. Such shadows can be caused by scanning the spine portion of a book.

Figure 12D:
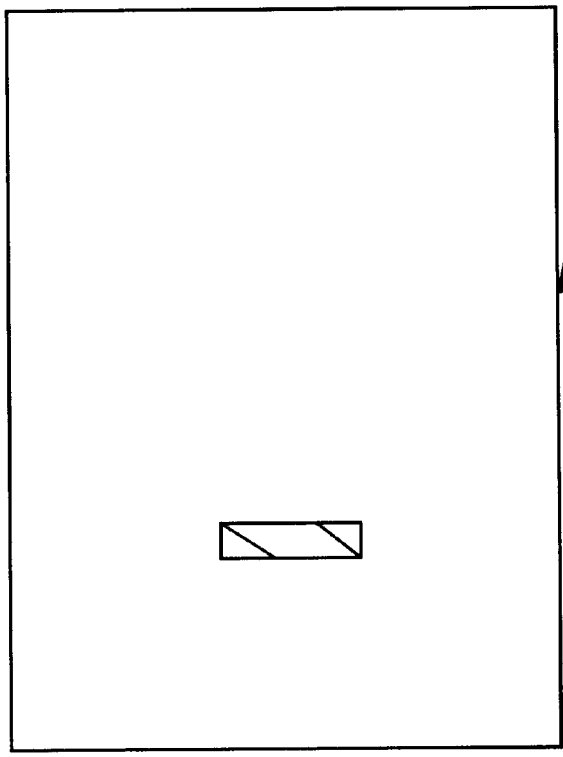

After the crease filter step 67, an image mask representing regions of graphical content is formed at step 70 in a manner as will be described in conjunction with FIG. 12B. The image mask is applied to the color image file 36b at step 72 (FIG. 4B). At step 73, a textlift mask illustrated in FIG. 12D is computed from the image mask and the OCR mask from step 56 and a textlift operation is performed on the color image 36b in a manner as will be described in conjunction with FIG. 12D. The color image 36b is cropped/scaled at step 74 and compressed at step 76.

A preferred compression technique for step 76 is a standard technique useful for image files such as the JPEG compression technique. Alternative techniques could be used.

At the output of the compression step 76 is a compressed image 28c and color information file 28c. With the compressed color document file 28 comprised of separate sub-files 28a, 28b and 28c that were produced by separate compression steps 58 and 76, a high quality, highly compressed composite color document file 28 is provided.

This approach takes advantage of the different requirements needed for compression of text and image containing documents. For the documents containing text, particularly when used with optical character recognition software, a high resolution scan and lossless or near lossless compression technique are necessary to provide a useful representation of the document. However, using a high resolution scan and lossless compression technique to operate on the image portions of a document would be highly wasteful in that the image portions of the document would substantially and unnecessarily (for many instances) increase the file size associated with the stored document.

Therefore, by providing separate graphical processing of the document in parallel or sequentially to OCR text processing of the document, it is possible to satisfactorily compress the image or graphical portions of the document in a manner that provides compressed image file 28b having a minimal file size for image portions of the document while providing file 28a which maintains a high resolution, near lossless compression of text portions of the document.

In certain instances the dominant background color enhancement does not work. This may result from the DBC being dark i.e. less than 50% intensity or an image mask (FIG. 12B) is more than 50% black i.e. the document is all image or the enhancement does not have a suitable visual appeal and the user cancels it.

Still referring to FIG. 4B, after steps 58 and 76 are completed the files 28a, 28b and 28c are stored at step 80. At step 82 the files are retrieved and the file 28a is decompressed at step 90 using the decompression technique for the particular compression technique at step 58. At step 92 file 28b is decompressed likewise using the decompression technique corresponding to the compression technique used in step 76. The decompressed text and image files provided from steps 90 and 92 are combined into a single image and text file 94 using the color information of file 28c to reproduce the decompressed image. Details on decompression of the image will be discussed in conjunction with FIG. 13.

Figure 5:
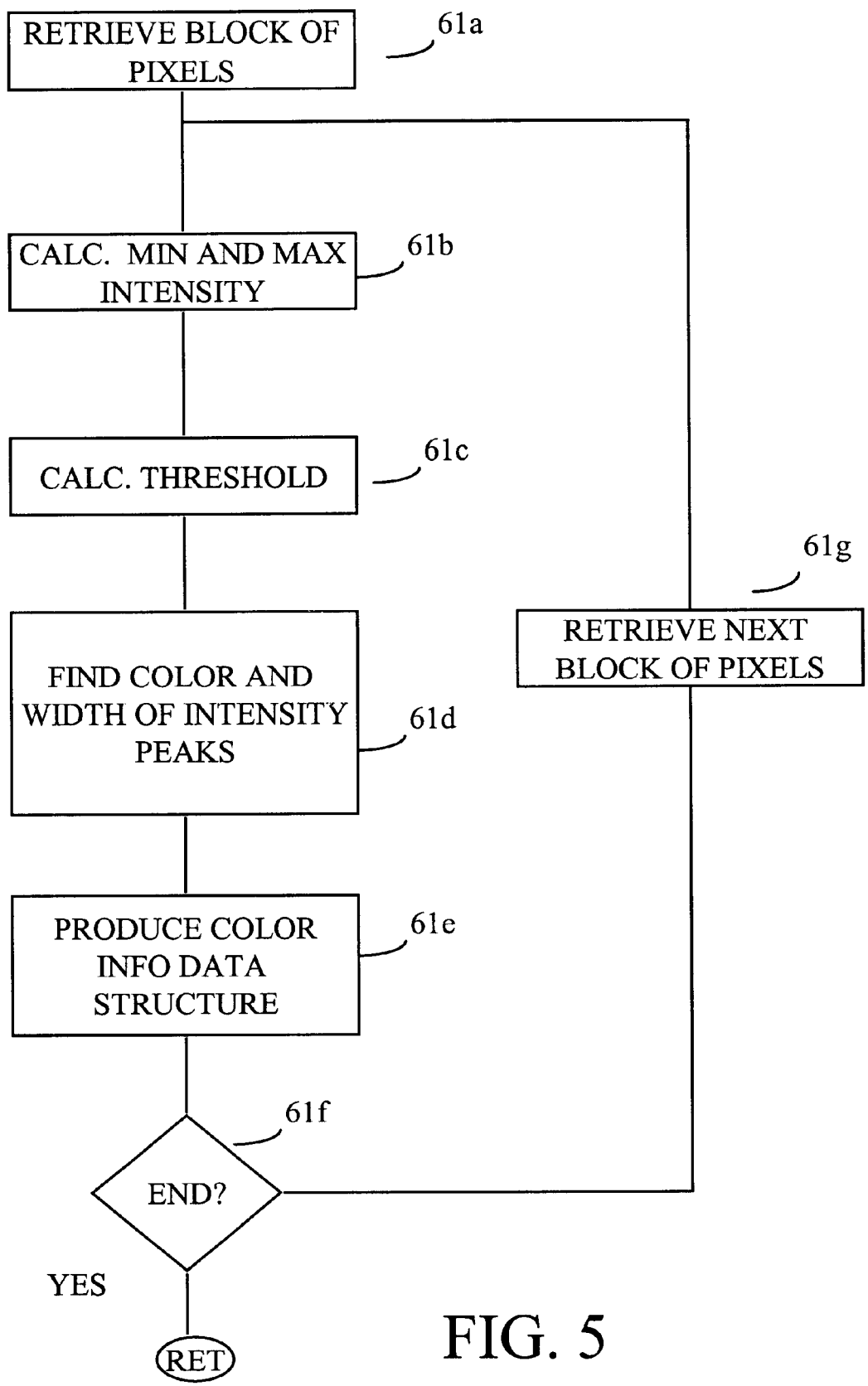
FIG. 5 is a flow chart of the steps used for color processing.
Figure 6A:
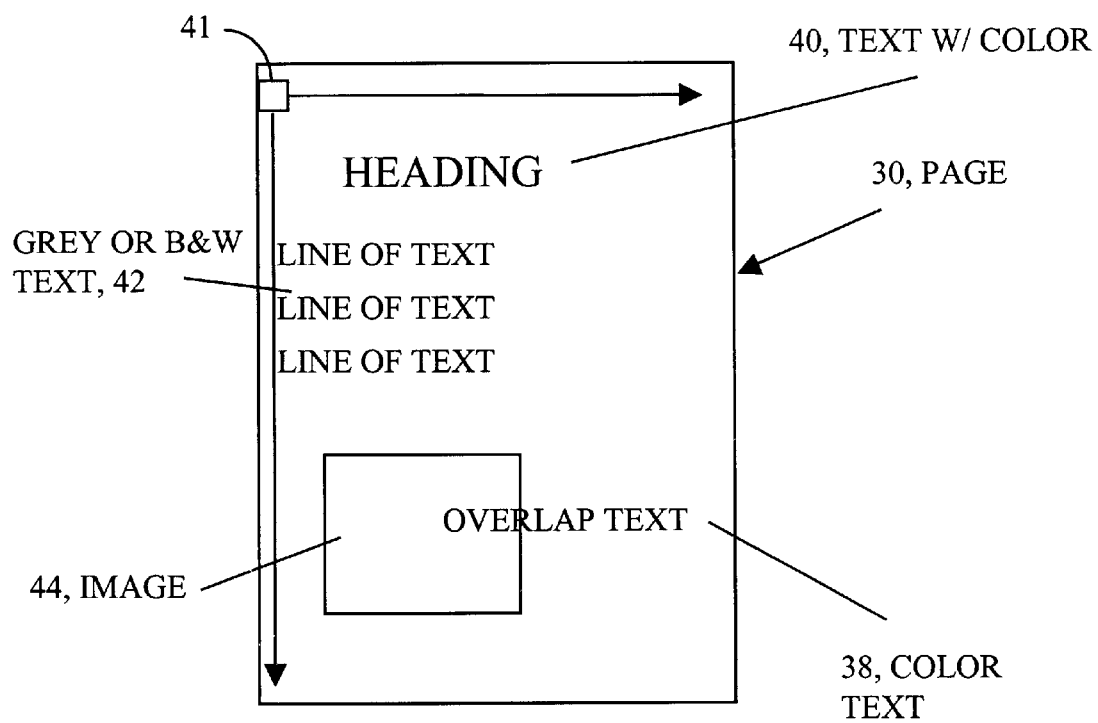
FIG. 6A is a pictorial representation of a technique for scanning the document of FIG. 3A to determine foreground and background colors of the document.
Figure 6B:
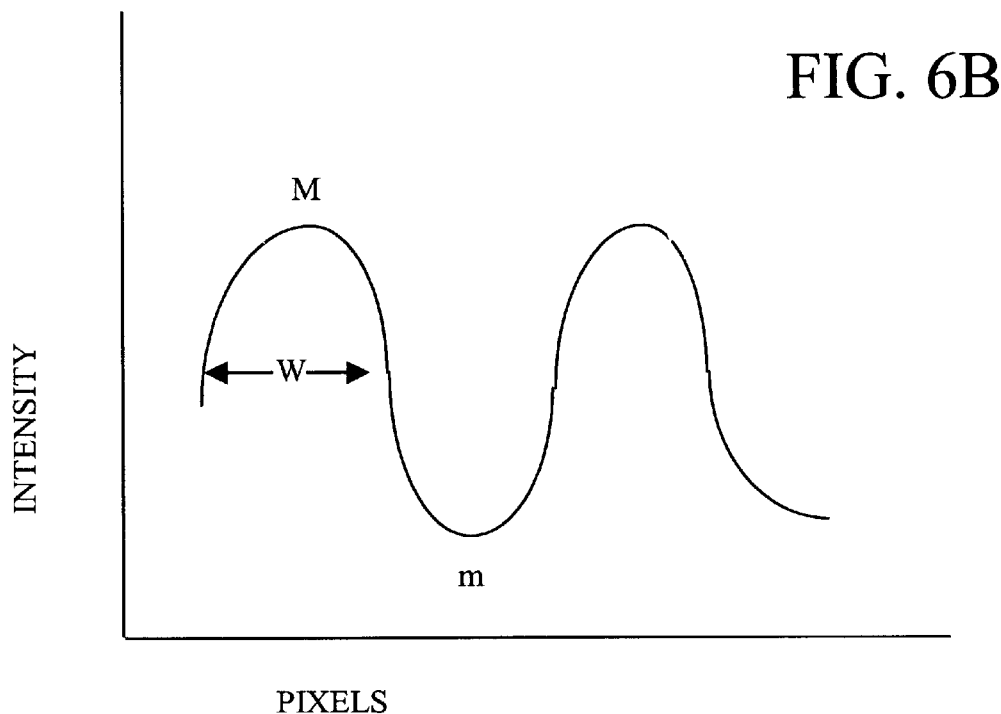
FIG. 6B is a plot of intensity vs. pixel location useful in understanding an application of an algorithm to determine colors at particular pixels in the image of the document.

Referring now to FIG. 5, steps 62 used in performing color analysis on the image file corresponding to a scanned document are shown. The color analysis is initiated by retrieving a block of pixels at step 61a. The block of pixels represents a sample of the pixels representing the data corresponding to the scanned image. As illustrated in conjunction with FIG. 6B, a block 41 of pixels corresponding to a portion of the document 0.1 inches square (although other sample sizes could alternatively be used), is scanned through the image file in a manner that mimics scanning across and down the page as illustrated (size of block exaggerated for clarity). For each block 41 of pixels, several characteristics concerning the data in the block 41 are determined. At step 61b, the data in the block 41 are used to calculate minimum and maximum intensities. Since the data in the block 41 are pixels which are a three-tuple of eight bits each of red, green and blue components, the sum of these color components is representative of the intensity of the color. Thus, for each pixel in the block an intensity calculation is performed and the pixel with the minimum intensity and the pixel with the maximum intensity are identified.

At step 61c, the average of the minimum and maximum intensities for the block or threshold for the block is calculated. At step 61d, the process 60 determines the color and width of all of the highest and lowest intensity peaks in the block. All the pixels in the block are viewed as a single linear sequence by conceptually concatenating all of the rows of a block into a single one-dimensional array. A high or low intensity peak is a subsequence of pixels in this array that are all above or below the threshold. The color of the peak is then taken to be the color of the first encountered pixel in the peak with the highest or lowest intensity; whereas, the width of the peak is taken to be the number of pixels counted as part of the peak. This is illustrated, for example, in conjunction with FIG. 6B where the width of the block is denoted as W and the maximum and minimum points in the block are denoted by M and m, respectively.

At step 61e, a data structure 65 (see FIG. 8) is populated with information concerning the pixel foreground color, the pixel background color and the number of peaks found within the block. This data structure 65 is populated on a block basis. Thus, for each one of the plurality of blocks of samples taken to be scanned across the page 30, a corresponding number of entries is provided in the data structure 65. Each entry in the data structure 65 includes the aforementioned foreground, background and number of peak values.

The foreground pixel value is taken to be the average of the lowest intensity peaks weighted by their widths as determined in step 61d. The background color is taken to be the average of the highest intensity peaks weighted by their widths as also determined in conjunction with step 61d. Preferably, calculations at steps 61d and 61e are computed as a running weighted sum obviating the need to store intermediate values of the peaks. Subsequent blocks are processed in a similar manner.

The data structure 65 illustrated in FIG. 8 has the following format:

```
{
    pixel fore;         /* foreground color (RGB) */
    pixel back;         /* background color (RGB) */
    Integer npeaks;     /* no. of peaks in block */
};
```

As can be seen, the output of the color analysis step 60 is a two-dimensional data structure 65 corresponding to each block or sample taken of the input image. The structure 65 stores foreground color information in field 65a as a three-tuple of eight bits each for red, green and blue intensities and background color as a three tuple of eight bits each for red, green and blue intensities in field 65b. The foreground color information is typically obtained from those portions of the image text corresponding to colorized text data; whereas, the background color represents background information of the scanned text and will be used to determine a dominant background color which can represent the background of the page, that is, the third component 21c of the model of the page described in conjunction with FIG. 3. Field 65c stores the number of peaks in the block. Step 61f determines if this is the last block and if it is not at step 61g the next block is fetched.

Figure 7:
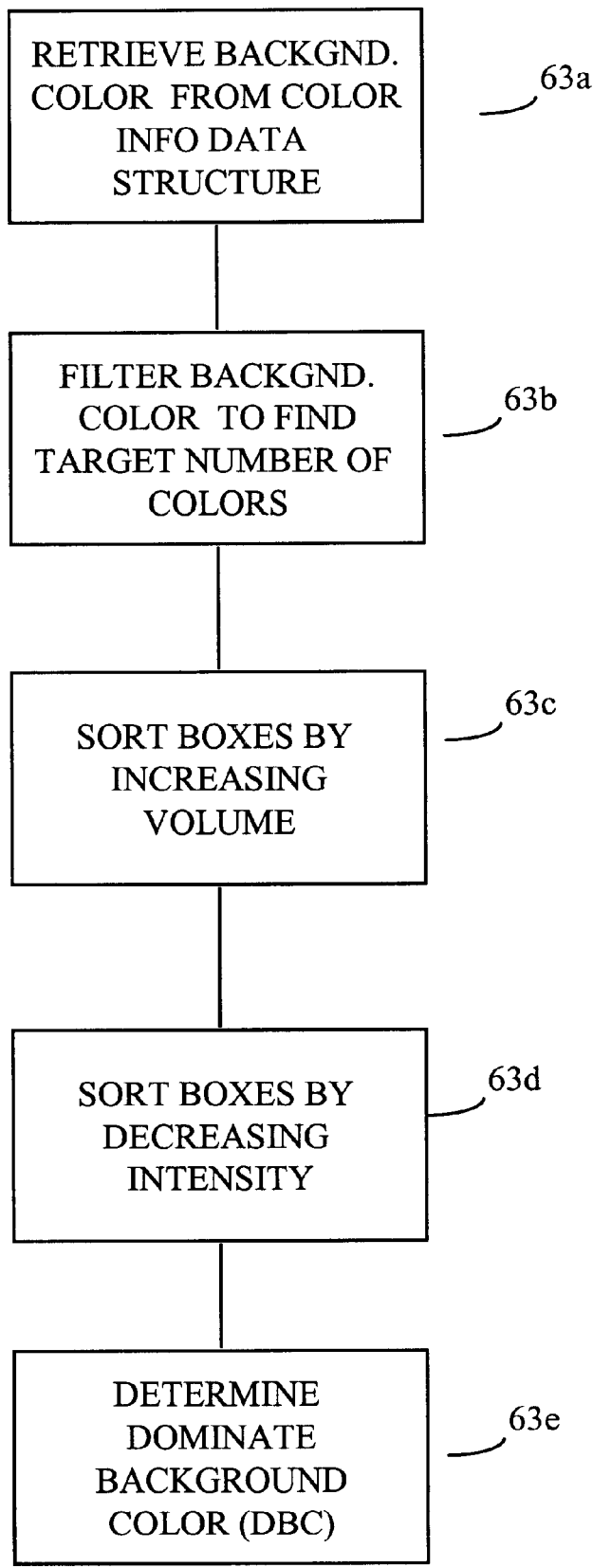
FIG. 7 is a flow chart depicting steps used to determine a dominant background color.

Referring now to FIG. 7, the process 62 used to determine a dominant background color to represent the background of the page, i.e., item 21c (FIG. 3) are shown. The dominant background color process 62 uses as an input the background colors for each block as determined in conjunction with the color analysis (FIG. 5A). It produces as an output a single color, that is, a three tuple of eight bits for red, green and blue intensities. This single color represents the best color to use as the background color and thus is here referred to as the dominant background color. The process also provides an estimate of the variance in the dominant background color across the image.

The process is initiated by retrieving at step 63a the background color information from the color information data structure. The background colors are operated on at step 63b by a variant of the so-called "Heckbert's Median Cut Algorithm". The median cut algorithm is ordinarily used to find the best colors to represent the color image with a fixed number of colors. The median cut algorithm for a target number of colors C (here 32) works by partitioning the R-G-B space, a three-dimensional space, into C number, here thirty-two (32) 3D boxes, each box containing approximately equal numbers of pixels from the source image. The median cut analysis assigns a color to each of the C number of boxes. Additional details concerning median cut analysis can be found in a paper entitled "Color Image Quantization for Frame Buffer Display", Proceedings of the Ninth Annual Conference on Computer Graphics (ACM SIGGRAPH COMPUTER GRAPHICS, 16(3), pps. 297–307 (1982).

After the boxes and the colors are found in step 63b, the box with the smallest volume in the R-G-B space is considered to represent the most common color and, therefore, the color which is a good estimate of the dominant background color. Of the smallest boxes, the box that also has the lowest intensity is also a criteria used to select the dominant background color.

In order to determine this box and the corresponding dominant background color, the boxes are sorted by increasing volume at step 63c and a subset of those boxes, here five of those boxes having the smallest volume are sorted by decreasing intensity at step 63d. At step 63e the color of the box having the lowest intensity is chosen as the dominant background color to represent the background color of the page.

At step 63f all the boxes are sorted by increasing distance (D) from the dominant background color. The distance is determined by:

$$D=\text{sqrt}((R1-R2)*(R1-R2)+(G1-G2)*(G1-G2)+(B1-B2)*(B1-B2)).$$

At step 63g the distance to the fifth box is used as a width estimate with a minimum distance of ten percent of an R, G or B value. The width estimate is used later to map pixels in the color image to the dominant background color. For example, grainy paper requires a wide tolerance in background color; whereas, some papers may have blocks of relatively light colors, yellow highlighting on white background, for example, that needs to be rejected as potential candidates for dominant background color. The width estimate is an estimate used to adjust a threshold between the limits of 10–20% of the dominant background color and generally will be suitable for most examples of color pages.

As explained in the above-mentioned Heckbert paper, the concept regarding the median cut algorithm is to use each of the colors in the synthesized color map to represent an equal number of pixels in the original image. This algorithm repeatedly subdivides color space into smaller and smaller rectangular boxes. Initially the process starts with one box which tightly encloses the colors of all the rows times the columns of pixels for the original image. The number of different colors in the first box is dependent upon the color resolution used. Typically 15 bits per color is sufficient for most cases. The box is shrunk to fit tightly around the points it encloses by finding the minimum and maximum values of each of the color coordinates. Adaptive partitioning is used to determine which way to split the box. The enclosed points are sorted along the longest dimension of the box and segregated into two halves at the median point. An approximately equal number of points will fall on each side of the cutting plane. The above is recursively applied until the target number of colors are generated.

If at some point in the subdivision it is attempted to split a box containing only one point, repeated many times perhaps, the spare box which would have gone unused can be reassigned to split the largest box that can be found. After the C number of boxes are generated, the representative for each box is computed by averaging the colors contained in each.

Figure 9A:
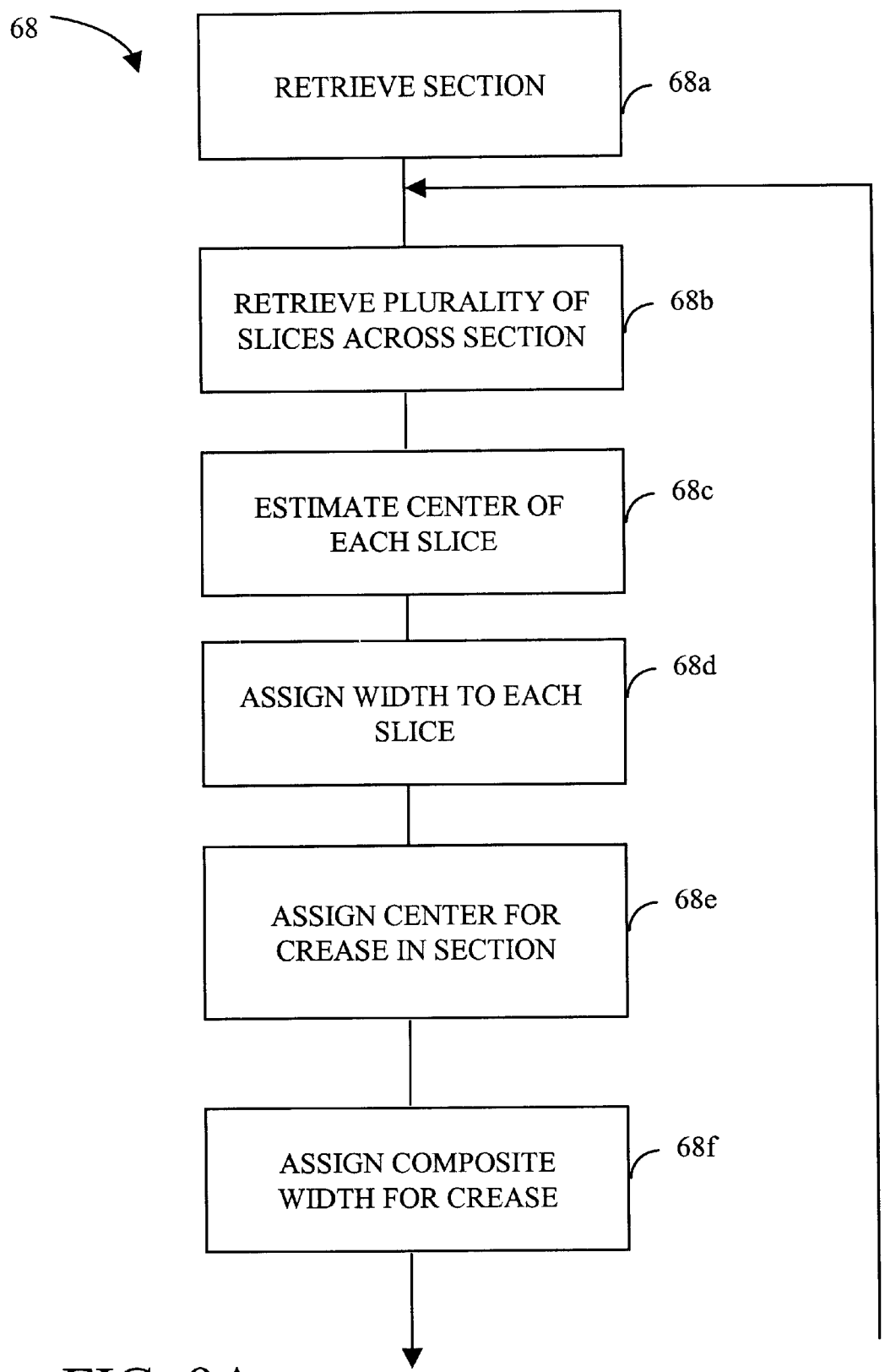
FIGS. 9A and 9B are flow charts showing steps used to identify a region having a crease.
Figure 9B:
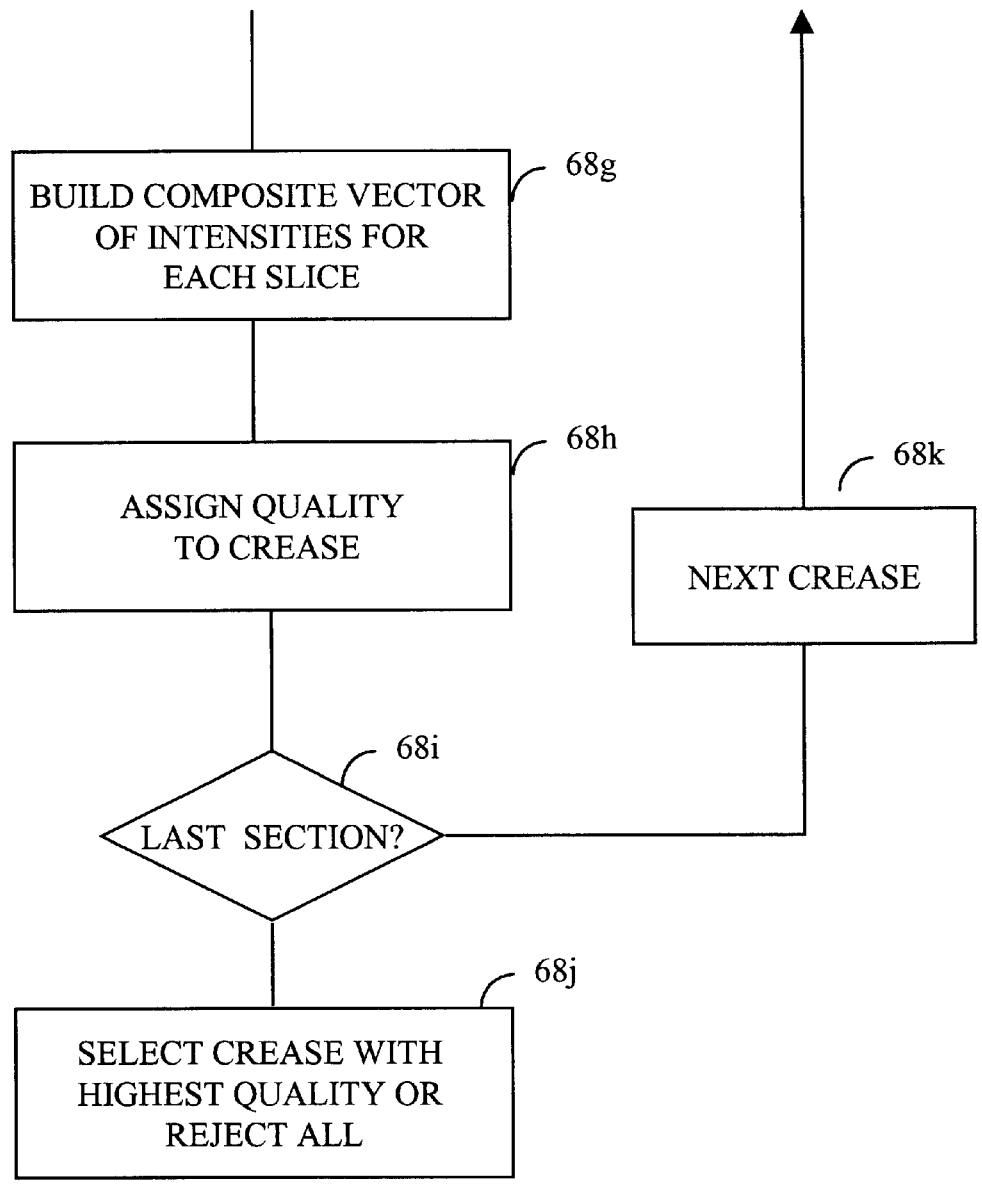
Figure 10:
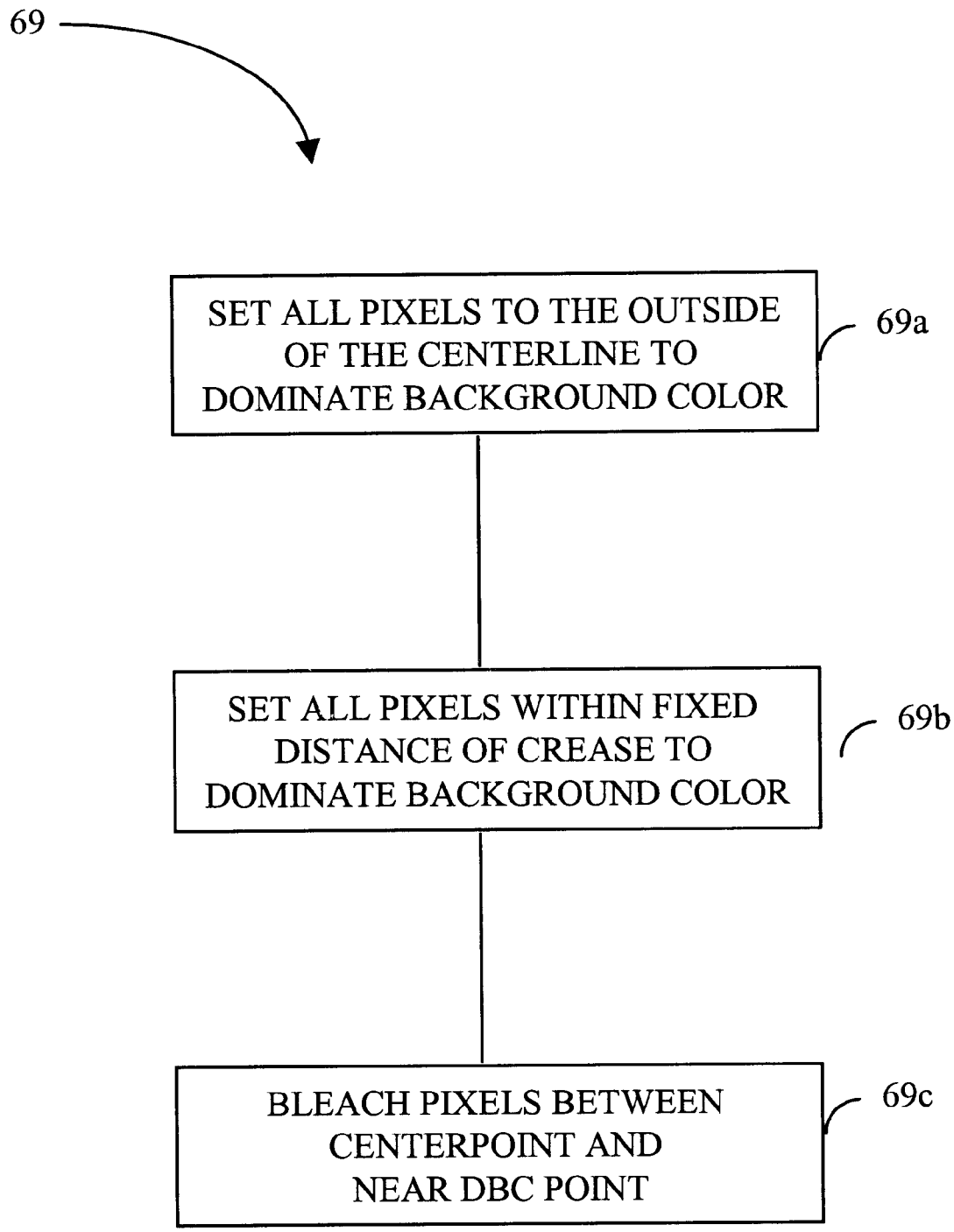
FIG. 10 is a flow chart showing steps used to remove an identified crease.

Referring now to FIGS. 9A, 9B and 10 steps 67 used in the crease filter are shown. The crease filter process has two parts, the initial part is a crease detector 68 (FIGS. 9A, 9B) and the second part is the crease removal filter 69 (FIG. 10). The crease filter 67 processes an input color image and a matching black and white image and uses as an input, the dominant background color as determined in step 64 (FIG. 4A) and the OCR region data as determined in step 52 (FIG. 4A, in order to avoid destroying real text information). The crease removal filter 67 produces a cleaned up color image and a cleaned up black and white image as output.

Figure 11:
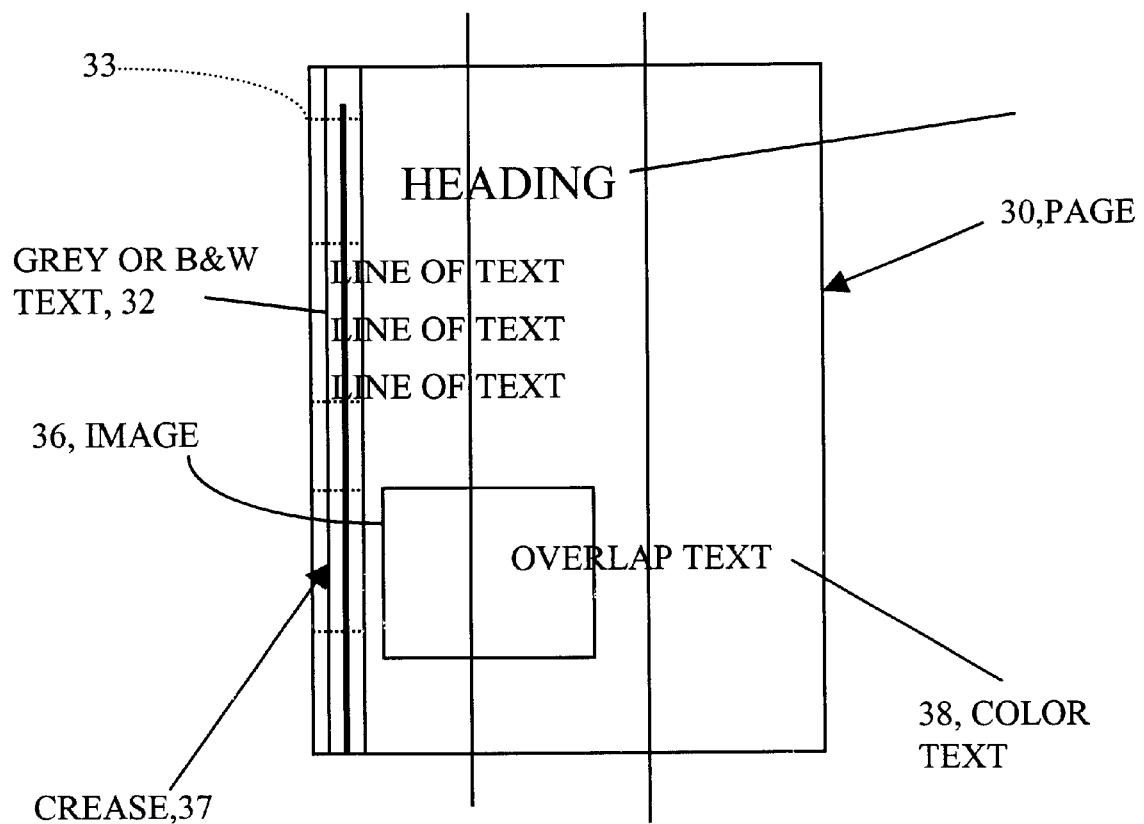
FIG. 11 is a diagrammatical view of the page of FIG. 3A having a crease and samples taken perpendicular to the crease useful in understanding the crease filter process of FIGS. 9A, 9B and 10.

As shown in FIG. 9A, a section is retrieved at step 68a. A section is here one of three vertical portions of the page that divides the page into equal sections of left, right and center portions (the likely areas for a crease provided by shadows in the spine, of a book or other document). Each area corresponds to the height of the page and is thus one-third the width of the page. The processing from steps 68a to 68h is performed independently on each one of the sections or areas of the page. At step 68b a plurality of slices or samples of the section are retrieved. These samples or slices are a one-dimensional array of pixels with a length equal to the width of the area and are illustrated in conjunction with FIG. 11 as dashed lines 33. These samples will be used to sample the quality of the image in section 30a. As shown, the crease is on the right side of the page. This corresponds to scanning the right side page of a book. Although not illustrated, a crease 37 could alternatively be found in section 30b if a book was opened to two pages, for example, and the crease line was in the middle of the image or at section 30c if the left page of a book was scanned.

The crease processing assumes that each of the slices 33 in an area occupied by a crease can be assumed to contain a V-shape in the intensity of the pixel across the slice (as illustrated in FIG. 11A). The processing of step 68 attempts to identify for which one of the sections 30a–30c and which one of the samples 33 within said sections this assumption is most correct.

At step 68c, therefore, the slices obtained in step 68b are calculated to determine the center (Cs) (FIG. 11A) of each slice. The center is determined to be the widest local minima in intensity. The widest local minima in intensity is determined by examining the pixels for the lowest intensity, that is, the sum of R-G-B components.

At step 68d a width (Ws) (FIG. 11A) is assigned to each slice. The width assigned to each slice is determined by measuring a distance from the center of the assumed V out to the nearest (near dominant background color) or within a predetermined amount, here 10% of the dominant background color pixel (DBC) (FIG. 11A). The direction is based upon the particular section processed. That is, for the left area it is anticipated that a crease will have the center of the V on the left and the near dominant background color on the right. Any slices that contain no dominant background color pixels in the appropriate direction are considered to be invalid slices and are discarded at this point. For those samples that have a dominant background color at the appropriate location, a center for the crease is determined by averaging the centers of the best slices at step 68e. The first average of the centers of all the valid slices are sorted by increasing distance from the first average. The average is recomputed using only the centers of the highest (NSLICES/ 2)+1, where (NSLICES) is the number of slices. The whole area is considered to be invalid if there are less than (NSLICES/2)+1 valid slices.

At step 68f a composite width is assigned for the area crease as the minimum area slice width, and at step 68g a composite vector of intensities for each slice is constructed. The composite vector of intensities is constructed from the center point of the crease to the near dominant background color point for the slice. It is again a one-dimensional array of integers with a length equal to the composite width as found in step 68f above. The array is used to represent the intensity values of a blank (dominant background color page) that would be seen across the crease. The array is filled in as follows: For a "enter" area, the following is performed twice, once for each side of the crease, producing two arrays.

First: define slice(I) to be the pixel in a slice that is I number of pixels from the center in the direction of the near-DBC point.

Then fill in the array:
array[i]=average of intensities of the slice[i] pixels for the valid slices.

Finally, iterating over I from the center out to the near-DBC point:
array[i]=maximum of array[i] and array[i−1]

The final step has the effect of making the values in the array increase monotonically outward from the center. This is a way to reject occasional dark pixels in the slice.

After the vector of intensities is determined at step 68g, a quality is assigned to the crease at step 68h. The quality is a measure of the overall likelihood that the area can qualify as a crease. The quality is assigned as follows.

The quality is equal to the width of the crease found or −1 if the area/crease fails one of several tests: The area fails to qualify as a crease if there are less than (NSLICES/2)+1 valid slices. The area also fails if the width is below a minimum crease width for example 4 pixels at 150 dpi. The area also fails if the majority of centerpoints used to construct the average centerpoint are not within a constant horizontal distance for example 40 pixels at 150 dpi of one another or if the vector of intensities appears concave.

This test rejects pages with color borders where it is better to give up than to attempt to remove the crease. The process continues by picking the crease with the highest quality (or rejecting them all).

If all of the sections have not been completed at step 68i, locations for data corresponding to the next section are determined at step 68j and control transfers back to step 68b where the processing occurs for the subsequent section. If all the sections have been determined at step 68i, then at step 68k the crease with the highest quality is determined as the crease for the page. If all of the creases have a quality of −1, however, then they are all rejected and there is not considered to be a crease on the page or the crease is not removable by this filter. The output at step 68 is the position, width and vector of intensities for a crease, or an invalid crease.

Referring now to FIG. 10, the process 69 for removing the crease is shown. The input for crease removal is a valid crease as found in step 68 above, the dominant background color of the page, a color image, a matching black and white image and the OCR region data in the form of a coarse bit map indicating where the OCR engine has found text. The output is a modified color image.

Removal of the crease works as follows. At step 69a if the crease is on the left or right side of the image, all the pixels to the outside of the center portion of the crease are set to the dominant background color. Thus, the crease is erased by use of the dominant background color or in the case of a black and white image by setting the crease to white. In addition, all pixels within a fixed distance, for example, 20 pixels at 150 dots per inch, are erased by setting the pixels to the dominant background color at step 69b. If the width of the crease is less than this value, then this step is ignored. For all other pixels within the width of the crease between the center point and the near dominant background color point, the pixels are bleached at step 69c by using the following:

define array[i] to be the intensity in the creases's intensity vector at a distance I pixels from the center.

define image[y][x] to be the pixel in the image x pixels horizontally and y pixels vertically from the upper-left corner.

define center to be the center of the crease and width to be its width.

define intensity(pixel) to be a function that returns the intensity of a pixel.

For a left-side crease:
iterate over y for each row in the image
iterate over I from the fixed distance to the crease width if ((intensity(image[y][center+*I*]+(intensity(*DBC*)−array[*i*])))> (0.90* intensity(*DBC*)))

then set image[y][center+I] to DBC and set the corresponding pixels in the B/W image to white.

As mentioned in conjunction with FIGS. 4A and 4B, mask generation and application are used on the high and low resolution images in order to isolate the information for the respective text and image files 28a, 28b.

Referring now to FIGS. 12A–12D, illustrative masks are shown. The OCR mask as illustrated in conjunction with FIG. 12A is produced using standard rendering algorithms to generate black rectangles corresponding to regions of OCR text. The input to OCR mask generation is the OCR text positional information as will be mentioned in conjunction with FIGS. 17–20. The output is a mask (a black and white) bitmap where each bit in the mask corresponds to a 16×16 pixel block in a 300 dpi image. Each bit is 1 (black) if the block contains part of an image of text that has been recognized by OCR.

The image mask as illustrated in conjunction with FIG. 12B for the image is obtained as follows. The input to mask generation is (1) the rotated/deskewed 300 dpi B/W bitmap, (2) the rotated/deskewed 150 dpi color bitmap, (3) the output of color analysis as described earlier (info about each 0.1" by 0.1" block (32×32 pixels at 300 dpi or 16×16 pixels at 150 dpi)) and (4) the dominant background color (DBC).

The output is a mask (a black and white bitmap) where each bit in the mask corresponds to an 8×8 pixel block in the 150 dpi image or 16×16 pixel block at 300 dpi image. The bit is 1 (black) if the block should be saved as a part of the color image and 0 otherwise. In general, mask generation works by classifying each block in the image independently as a background color or not. The process filters and fills-in black areas of the mask to make connected "blobs". In detail, the steps in pseudocode are:

For each block
    Compute raw difference
    Compute background color difference
    Read npeaks statistic from colorinfo Mask bit= (weighted sum>threshold)
For each block
    black is set to white if black patch is 2×2 or smaller
    Repeat until no transitions or 10 times For each block
    white is set to black if black neighbor and B/W bitmap for block mostly black.
    Repeat until no transitions or 10 times
For each block
    white is set to black if black mask bits within 10 blocks N, S, E and W.

Thus, for each block, a decision is made as to whether the block contains color or not. The decision is made by measuring three features of the block, adding the measurements, comparing the sum to a threshold and declaring the block to be a color block if the sum exceeds the threshold (a "linear classifier"). The three measurements are set forth below.

The first measurement is the "raw difference" between the color bitmap and a trial reconstruction. Each pixel in the block is reconstructed using the reconstruction algorithm above at 150 dpi based on only the DBC, B/W bitmap and foreground colors. Each reconstructed pixel is compared to the corresponding pixel in the 150 dpi color bitmap. The distance between the two pixels in RGB space is determined. The first measurement is the count of all the pixels in the block that have a distance of more than 20% of the maximum possible distance. The first measurement is a number of pixels from 0 to 64.

The second measurement is the distance in RGB space between the "background color" for the block (as computed by color analysis) and the DBC. The second measurement is a number from 0 to 255*sqrt(3).

The third measurement is the "npeaks" statistic for the block from color analysis. The third measurement is a number from 0 to 128.

The three measurements are summed and (all constants determined empirically):
    maskbit is 1 if (first_measurement*4+second_measurement/sqrt(3)+third_measurement/8)>127

Isolated patches of black in the mask that are 2×2 pixels or smaller in size are removed. The patches of black in the mask are expanded by reconsidering blocks marked white in the mask that are neighbors to blocks marked black in the mask. This expansion is performed iteratively until no more blocks are switched from white to black or until a predetermined number of times for example 10 have been performed.

Expansion operates as follows: For each white bit in the mask that's next to a black bit, the white bit is changed to black if the block corresponding to the white mask bit is more than 50% black in the B/W bitmap.

Finally, the patches of black in the mask are filled in with another iterative procedure and repeated until no more blocks are switched from white to black or until a predetermined number of times for example 10 have been performed. The fill-in procedure changes a white bit to black in the mask if there are black bits in the mask to the north, south, east and west of the white bit and less than 10 bits distant. Iterating this procedure has the effect of filling in mixed white/black areas to solid black. Other algorithms could alternatively be used.

As shown in FIG. 12C, text mask 99 is computed by the bitwise logical operation:
    text mask (99)=OCR mask (97) OR NOT image mask (98)
Bits set in the text mask represent 16×16 blocks of black and white image 36a to be saved in the black and white image file 21a.

As shown in FIG. 12D, textlift mask 99a is computed by the bitwise logical operation:
    textlift mask (99a)=OCR mask (97) AND image mask (98)

Bits set in the textlift mask represent 8×8 blocks of color image 36b on which to perform a textlift operation. The textlift operation is intended to remove images of text from the color image file 21b based on the assumption that images of text are better represented by the black and white image file 21a with colorization information. Text in the color image file 21b may have a poor visual appearance due to distortions introduced by reduced resolution and by the information loss in JPEG or similar compression algorithms. JPEG or similar compression algorithms also tend to achieve higher compression ratios with text removed. The textlift operation performed in Step 73 (FIG. 4B) proceeds as follows: for each block in which the textlift mask 99a is true, replace pixels in the color image 36b with background color from the color analysis data structure 65 if any of the corresponding pixels in the black and white image 36a are black. The result is that the image of text is removed from the color image and replaced with a neutral color appropriate for that block. The use of the neutral background color is important for both viewability and compressibility.

In pseudo-code:
    For each block of color image 36b for which the corresponding bit in textlift mask 99 is set:
        For each pixel in that block of color image 36b for which any of the corresponding pixels in black and white image 36a are black:
            Replace the pixel in color image 36b with the corresponding "background" color from data structure 65.

Referring now to FIG. 13, details on the reconstruction of a stored compressed file 28 to produce an image for display or manipulation is shown. Initially, the image is stored in three subfiles 28a–28c. Subfile 28a includes a 300 dpi 1-bit, black-on-white bitmap (the "B/W bitmap") with all the text in it, compressed using the "Cartesian Perceptual Compression" (CPC) package from Cartesian Products, Inc or other compression algorithm. The second file 28b includes a cropped (possibly to nothing), lower-resolution bitmap. This bitmap of subfile 28b is at a reduced resolution of 150 dpi or 75 dpi, for example. It is a 24-bit, color image (the "color bitmap") compressed using JPEG compression or another suitable compression technique. Here JPEG compression is used since it works well on continuous-tone pictures. Subfile 28c includes a representation of the foreground colors (the "foreground color array") in the form of a 2D array of the "foreground" colors from color analysis. These colors are compressed by reducing the color depth and then applying a run-length encoding that takes advantage of the fact that many of the colors are "don't cares" because the corresponding part of the B/W bitmap is all white. File 28c also contains the dominant background color and "xoff", "yoff", offsets of the (cropped) color bitmap.

The reconstruction process 80 proceeds as follows: At step 82 file 28 is retrieved. At step 84, a color target bit map is allocated to receive the reconstructed image. The size of the bitmap is determined from the size of the stored B/W bitmap adjusted for the desired target resolution. At step 86 the target output bitmap is filled with the dominant background color from subfile 28c as the default color by setting every pixel in the target bitmap to the DBC. After this step the target bitmap is a single solid color, the dominant background color (DBC). At step 88 subfile 28b containing the compressed image is decompressed. The decompressed subfile 28b is scaled and inserted at step 90 into the target bitmap. The file is copied and inserted into its correct position using the offsets (xoff, yoff).

The decompressed-scale-insertion can be done in one pass as the JPEG is read from disk without storing a full-size temporary buffer for the color bitmap in memory. After this step, pixels in the target bitmap are either DBC or whatever was read from the compressed image 28b. The process at step 92 decompresses the foreground color array into a small temporary two-dimensional array where each element in the array represents the intended foreground color of a block of pixels in the target bitmap. At step 94 the B/W subfile 28a is decompressed and scaled to the target resolution with anti-aliasing (i.e., allow the scaled pixels to be gray to better represent pixels on the boundaries of black and white areas). The resulting target-DPI grayscale pixel is used to "mix" the color of the corresponding pixel in the target bitmap with the color of the encompassing block in the two-dimensional foreground color array as follows:

Consider each anti-aliased grayscale pixel to be a number from 0.0 to 1.0 where 0 is white and 1 is black. Alter the color of the corresponding target pixel to be:

$$target\_pixel = (target\_pixel*(1.0 - grayscale\_pixel) + forecolor\_pixel*grayscale\_pixel)$$

The de-compression, anti-aliasing and mixing also can be done in one pass. The decompressed B/W bitmap is stored in temporary memory due to a limitation in the interface to the CPC compression package.

Referring now back to FIG. 1, the computer system 10 can be configured with specialized software 130 to give the computer a reading machine function. The software is resident on the mass storage element 16 as image display and conversion software 130 (FIG. 2) that controls the display of a scanned image provided from scanner 24. In addition, the software 130 permits the user to control various features of the reader by referencing the image representation of the document displayed by the monitor. The image to be scanned in this embodiment is either color or black and white. In addition the image representation can contain graphics, pictures and so forth. When a color image is scanned or retrieved, the process of step 34 can also be used. For instance when the reading system is operating on a compressed color image as described above, processing is essentially the same as for a black/white image except that when coordinates from the OCR file are used to locate a word or other item, the coordinates are scaled to take into consideration that the color image is reconstructed at a different resolution than the OCR data.

Figure 14A:
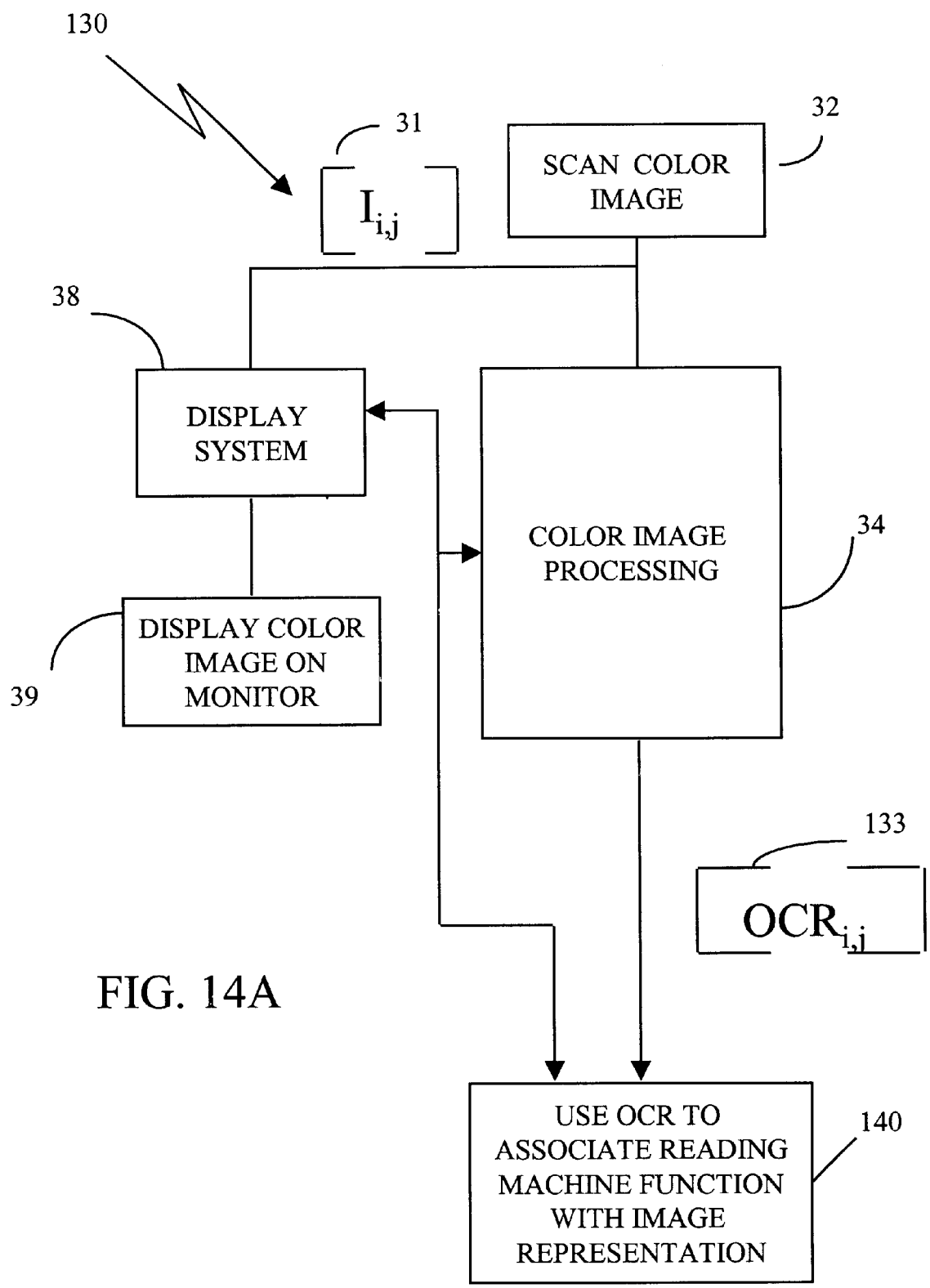
FIGS. 14A and 14B are flow charts showing steps used to display and compress a color document and associate selected text on a displayed image representation through OCR generated text to permit voice synthesis and highlighting of an image representation for a reading system.

Referring now to FIG. 14A, the steps used in the image display and conversion software 130 when the computer 10 is configured as a reading machine, include scanning (step 132) an input document to provide an image file in a similar manner as set out in FIG. 2 for step 32. In general the input document is scanned in a conventional manner and produces image file 31 that is fed to optical character recognition (OCR) module which is part of color image processing software 24 described in FIGS. 4A–4B. The OCR software uses conventional optical character recognition techniques on the data provided from the scanned image 31 to produce the output data structure 35. Also at step 140, the OCR output data structure 35 is used to associate reading machine functions to an image representation displayed on the display. Alternatively, image-like representations can be used as a source such as a stored bit-mapped version of a document.

Figure 17:
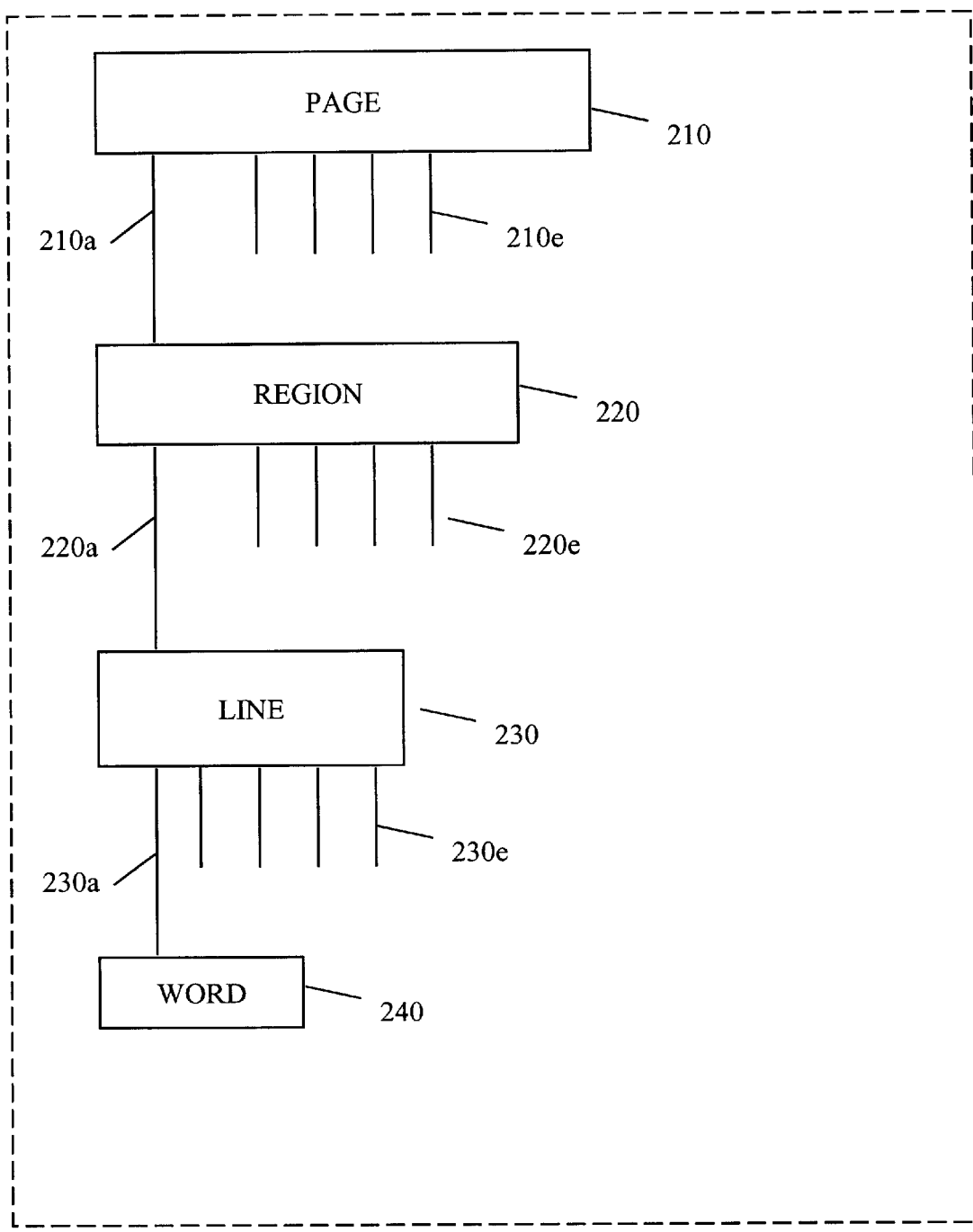
FIG. 17 is a diagrammatical representation of a data structure used in the process of FIG. 14B.

Referring momentarily to FIG. 17, it can be seen that the data structure 35 includes a data structure element 240 for a particular word and an OCR text representation of the word stored in field 242. The data structure 240 also has positional information including X-axis coordinate information stored in field 243, Y-axis coordinate information stored in field 244, height information stored in field 245 and width information stored in field 246. This positional information defines the bounds of an imaginary rectangle enclosing an area associated with the corresponding word. That is, if a pointer device such as a mouse has coordinates within the area of this rectangle, then the mouse can be said to point to the word within the defined rectangle.

The image file 31 is also fed to a display system 38 which in a conventional manner processes the image file to permit it to be displayed on the monitor at step 39. As shown, the text file 35 provides an input along with other commands driven by the operating system (not shown) to a module 140 which is used to associate user initiated actions with an image representative of a scanned document. In addition, both the image file 31 and the text file 35 are stored in the reading system for use during the session and can be permanently stored for latter use. The files are stored using generally conventional techniques common to WindowsNT® or other types of operating systems.

Figure 14B:
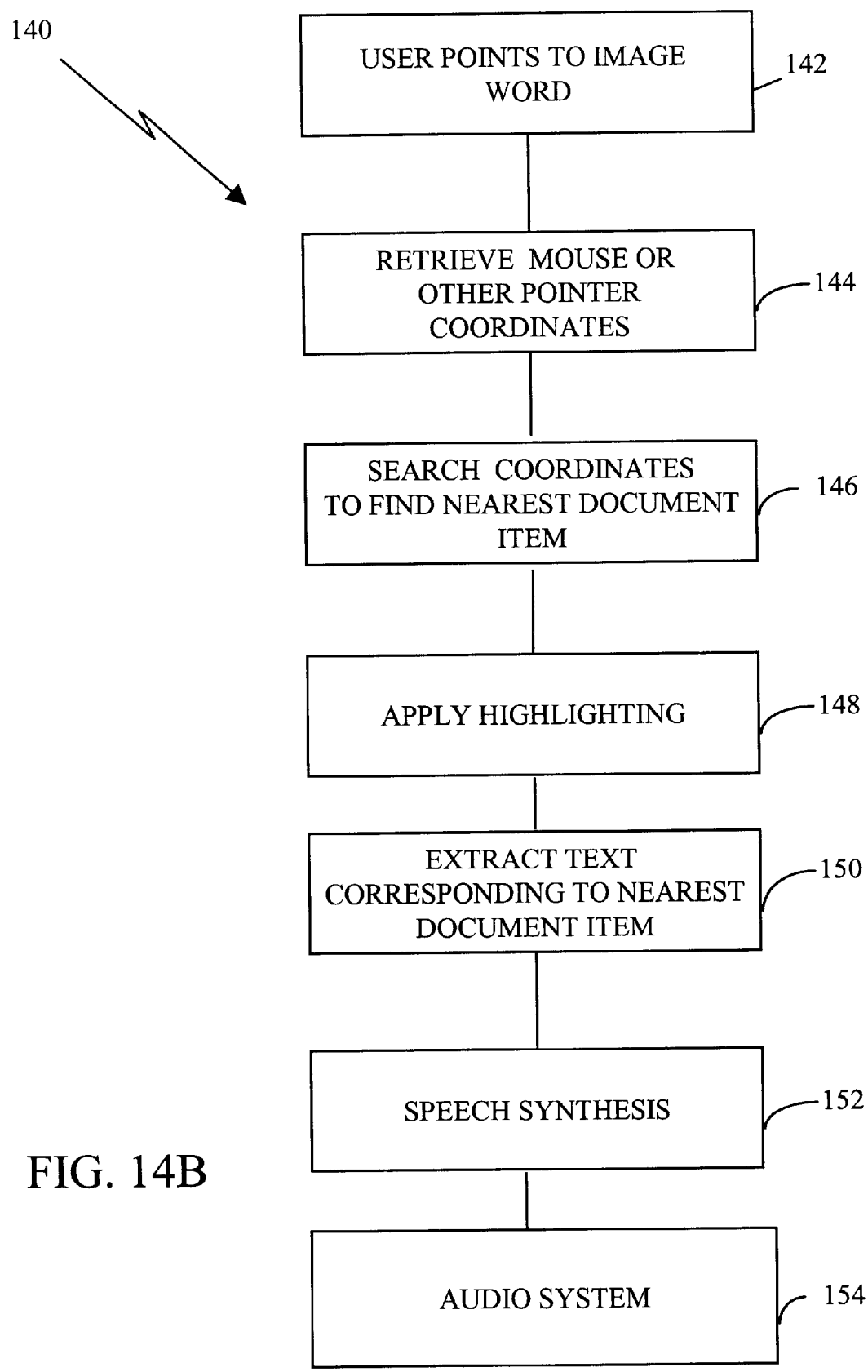

Referring now to FIG. 14B, the user controls operation of the reading system 10 with reference to the image displayed on the monitor 20 by the steps generally shown by the software module 140.

A user initiates reading of the scanned document at the beginning of the document by selecting a reading mode. Alternatively, the user can have the document start reading from any point in the document by illustratively pointing to the image representation of an item from the scanned document displayed on the monitor at step 142. The document item is the actual image representation of the scanned document rather than the conventional text file representation. The item can be a single word of text, a line, sentence, paragraph, region and so forth. The user activates a feature to enable the reading machine to generate synthesized speech associated with the selected image representation of the document item. For purposes of explanation, it will be assumed that the document item is a word. In addition to pointing to a word, a pointer such as a mouse can point within the text in the image in other ways that emulate the pointer behavior typically used in computer text displays and word processing programs. For instance, by simply pointing to a word the software selects a position in the text before the word; whereas, pointing to a word and clicking a mouse button twice will cause the word to be selected and pointing to a word and clicking an alternate mouse button selects several words, starting at a previously determined point and ending at the word pointed to.

The user can use a mouse or other type of pointing device to select a particular word. Once selected, the software fetches the coordinates associated with the location pointed to by the mouse 19 (FIG. 1) at step 144. Using these coordinates the word or other document item nearest to the coordinates of the mouse is determined. The information in the data structure 200 is used to generate highlighting of the word as it appears on the display item as well as synthesized speech as will be described.

Figure 15A:
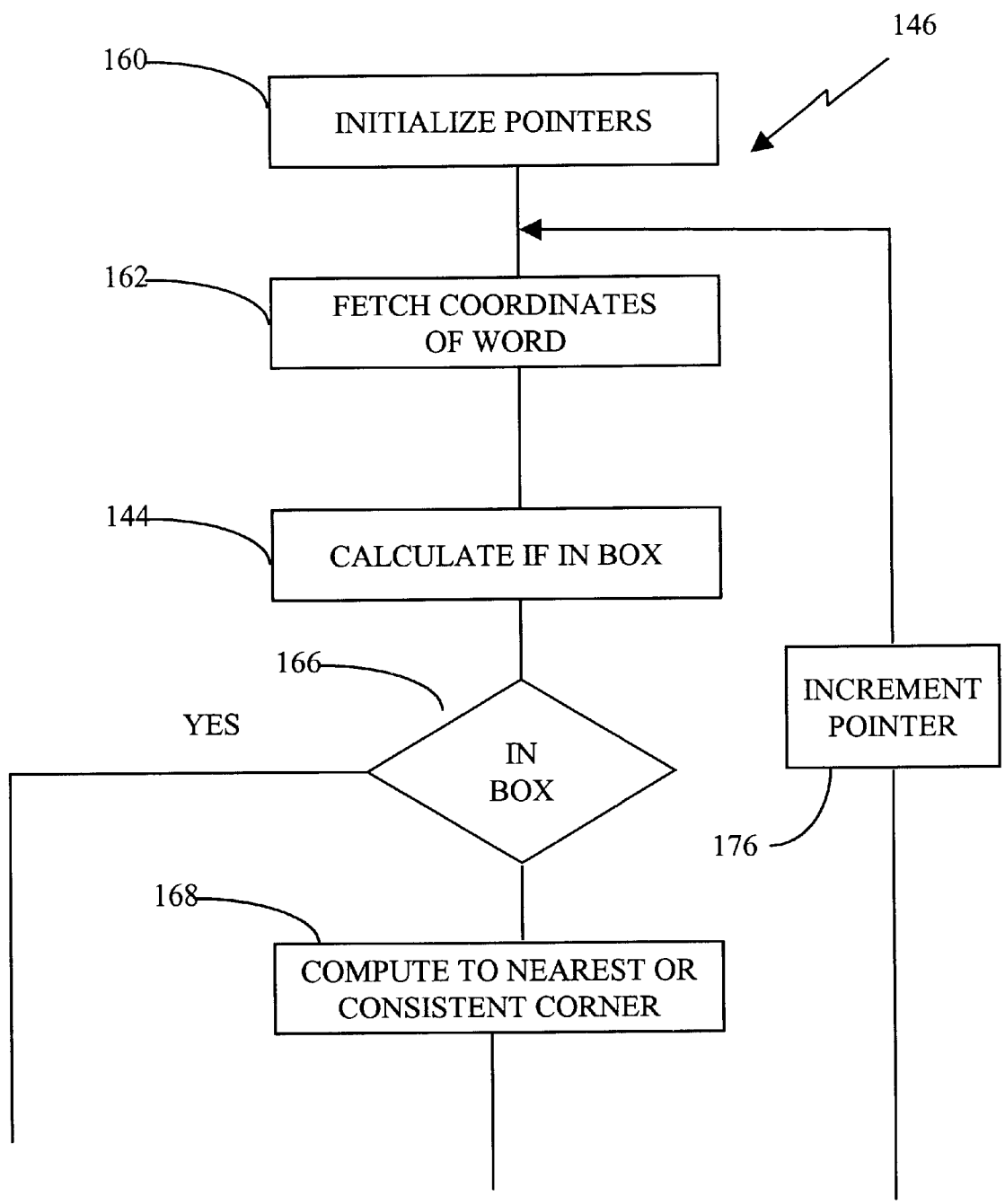
FIGS. 15A–15C are flow charts showing steps used to calculate the nearest word for use in the process described in conjunction with FIG. 14B.
Figure 15B:
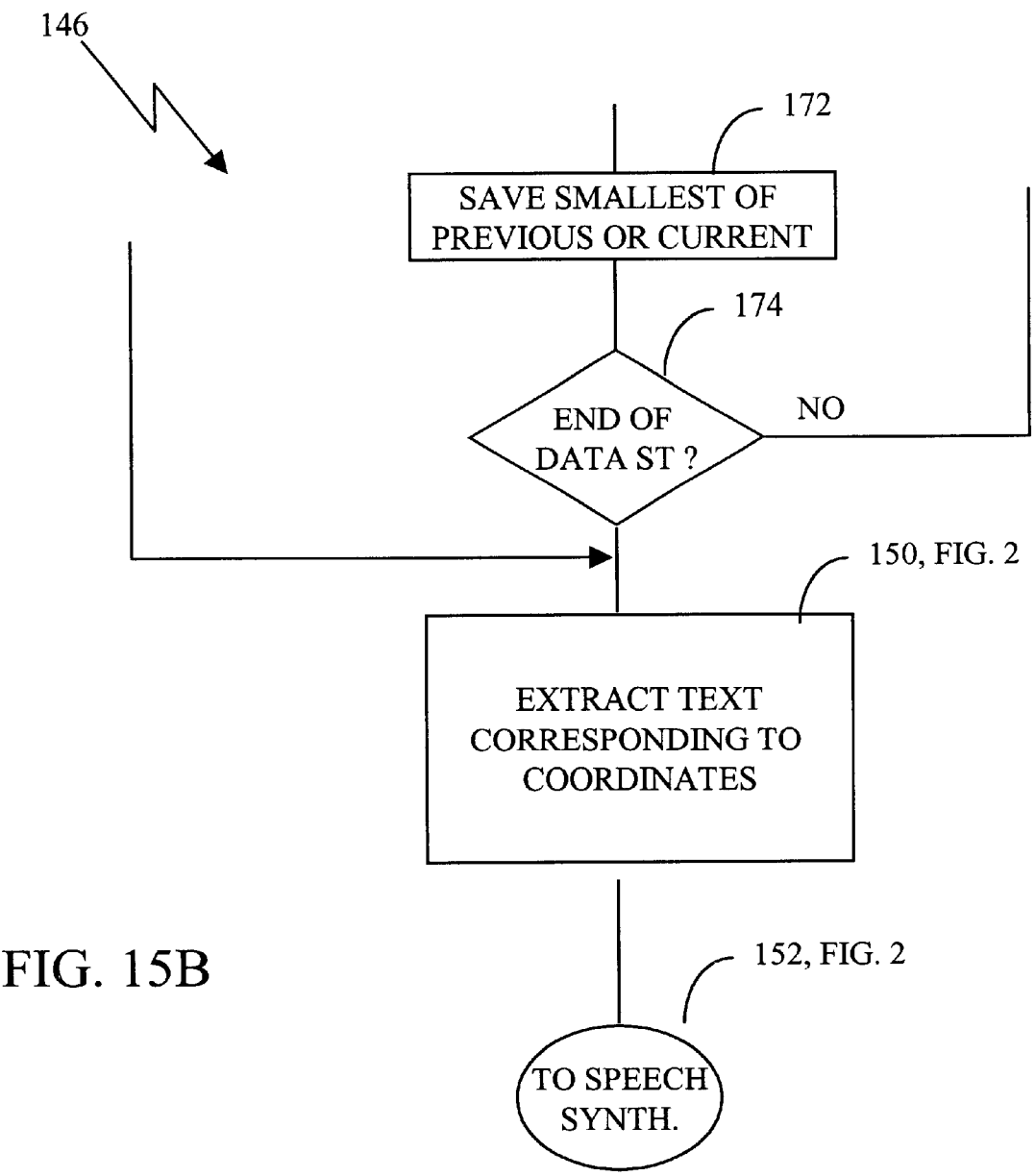
Figure 15C:
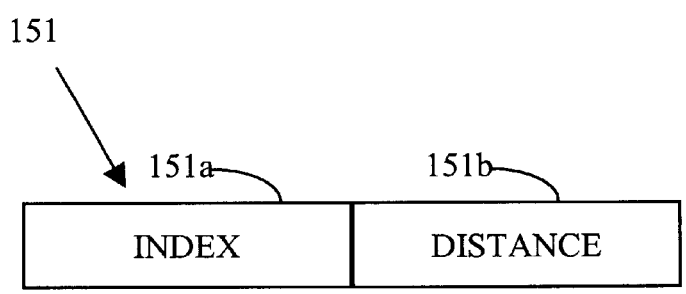
Figure 15D:
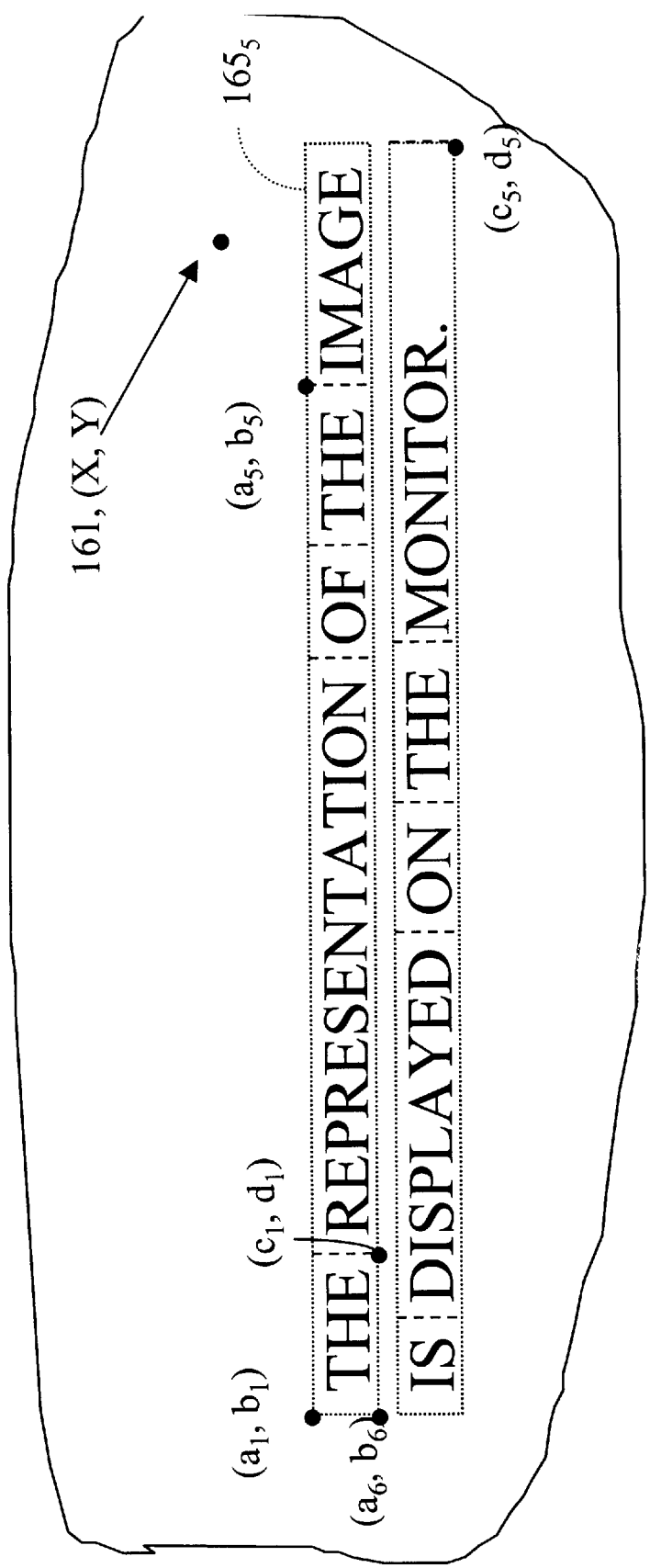
FIG. 15D is a pictorial representation of a portion of the image representation of text displayed on the monitor useful in understanding the process of FIGS. 15A–15C.

The searching step 146 as will be further described in conjunction with FIGS. 15A–15C will search for the nearest word. Alternatively, a searching step 146' as will be described with FIGS. 21A–21C can also be used. The search operation performed by searching step 146' is based upon various attributes of a scanned image.

After the nearest word or nearest document item has been determined at step 146 or 146', the highlighting is applied to an area associated with the item or word at step 148. The text corresponding to the nearest document item is also extracted at step 150 and the text representation is fed to a speech synthesizer 152 to produce electrical signals corresponding to speech. The electrical signals are fed to the audio system 154 to produce speech corresponding to the nearest document item while the monitor 20 displays the item and highlighting is applied to the item.

Referring now to FIGS. 15A–15C, the process 146 used to determine a nearest word in a scanned image are shown. At step 160 a pointer is initialized and a maximum value is loaded into a displacement field 151b of structure 151 (FIG. 15C). The displacement field 151b is used to store the smallest displacement between a word boundary and the coordinates of the pointing device. The pointer initialized at step 160 is a pointer or index into the OCR generated data structure 135. (FIG. 17). The software 146 retrieves each word entry in the data structure 135 to determine for that word in accordance with the image relative position information associated with the OCR text generated word whether or not that particular word is the closest word to the coordinates associated with the user's pointing device.

At step 162 the coordinates associated with a first one of the words are fetched. At step 164 the coordinates associated with the first one of the fetched words are used to determine whether the pointing device is pointing to a location within a box 165$_5$ that is defined around the word. Thus, as shown in conjunction with FIG. 15D, the mouse points to a spot 161 having coordinates $X_i$, $Y_j$. For any document item on the scanned image, an imaginary box here 165$_5$ is assumed to exist about the word "IMAGE" in FIG. 15D. Thus, if the pointing device coordinates fall within the box 165$_5$ the pointing device would be considered to point to the document item "IMAGE" associated with the box 165$_5$.

In the data structure 35 each of the words will have associated therewith the OCR text converted from the image file 31, as well as position and size data that identifies the position and size of the word as it appears on the original document. Accordingly, this information locates the word in the displayed image of the document. Therefore, to determine the closest word, it is necessary to determine the boundaries of the box that the particular word occupies. At step 164, the software determines whether or not point 161 falls within the box by considering the following: For a mouse coordinate position (X, Y) the location pointed to by the mouse can be considered to be within a region of an image word having points defined by coordinates ($a_i$, $b_j$) and ($c_k$, $d_l$) where $c_k=a_i+w$ and $d_l=b_j-h$, if $X \geq a_i$ and $Y \leq b_j$ and $X \leq c_k$ and $Y \geq d_l$ where it is assumed here that the positive direction of the coordinates is upward and to the right.

If this condition is satisfied, then the point 161 can be considered to be within the box and, hence, at step 166 control will pass directly to step 150 (FIG. 4B). From the information mentioned above, therefore, the point (c, d) can be determined by adding the width (w) of the box to the x coordinate ($a_i$) associated with the image and subtracting the height (h) of the box from the y coordinate ($b_j$) associated with the image.

If, however, the point 161 is not within the box as is shown, then the software 146 determines the word which is nearest to the point 161 at step 168 by one of several algorithms. A first algorithm which can be used is to compute the distance from a consistent corner of the box associated with the word to the position of the mouse pointer 161. In general, the distance (S) to a consistent corner would be computed as the "Pythagorean" technique as follows:

$$S=((X-a_i)^2+(Y-b_j)^2)^{-2}$$

Alternatively, this equation can be used at each corner of each box and further processing can be used to determine which one of the four values provided from each corner is in fact the lowest value for each box.

In either event, the computed value (S) is compared to the previous value stored in displacement field 151b. Initially, field 151b has a maximum value stored therein and the smaller of the two values is stored in field 51b at step 172. Accordingly the first computed value and the index associated with the word are stored in the structure 151 as shown in FIG. 4C. At step 174 it is determined whether or not this is the end of the data structure. If it is the end of the data structure then control branches to step 150 and hence step 152. If it is not the end of the data structure then the pointer is incremented at step 176 and the next word in the data structure as determined by the new pointer value is fetched at step 162.

The second time through the process 146 in general will be the same as the first time except that step 172 will determine whether the previously stored value ($S_p$) in fields 151a, 151b is greater than or less than a current calculated value ($S_c$) for the current word. If the current value ($S_c$) is less than the previous value $S_p$, then the current value replaces the previous value in field 151b and the index associated with the current value replaces the previous index stored in field 151a.

In this manner, the structure 151 tracks the smallest calculated distance (S) and the index (i.e., word) associated with the calculated distance. The process continues until the positional data for all of the words in the data structure associated with the particular image have been examined. The values which remain in the data structure 51 at the end process thus correspond to the closest word to the location pointed to by the mouse coordinates 61.

Referring now back to FIG. 14, once the nearest coordinates for the nearest data item are determined, the process 140 applies highlighting as appropriate to the selected item. Prior techniques for providing highlighting would simply highlight a line or a paragraph in the text representation displayed on the monitor. The highlighting would be of the current word that is being read aloud to the user. Although this is acceptable, a preferred approach as described herein applies double highlighting and still preferably applies double highlighting to an image representation of a scanned document.

The selected paragraph or sentence is highlighted with a first transparent color, whereas, each individual word as the word is spoken through the speech synthesizer at step 152 is highlighted with a second, different transparent color. Accordingly, highlighting is applied at step 148 in a manner as will now be described.

Figure 16:
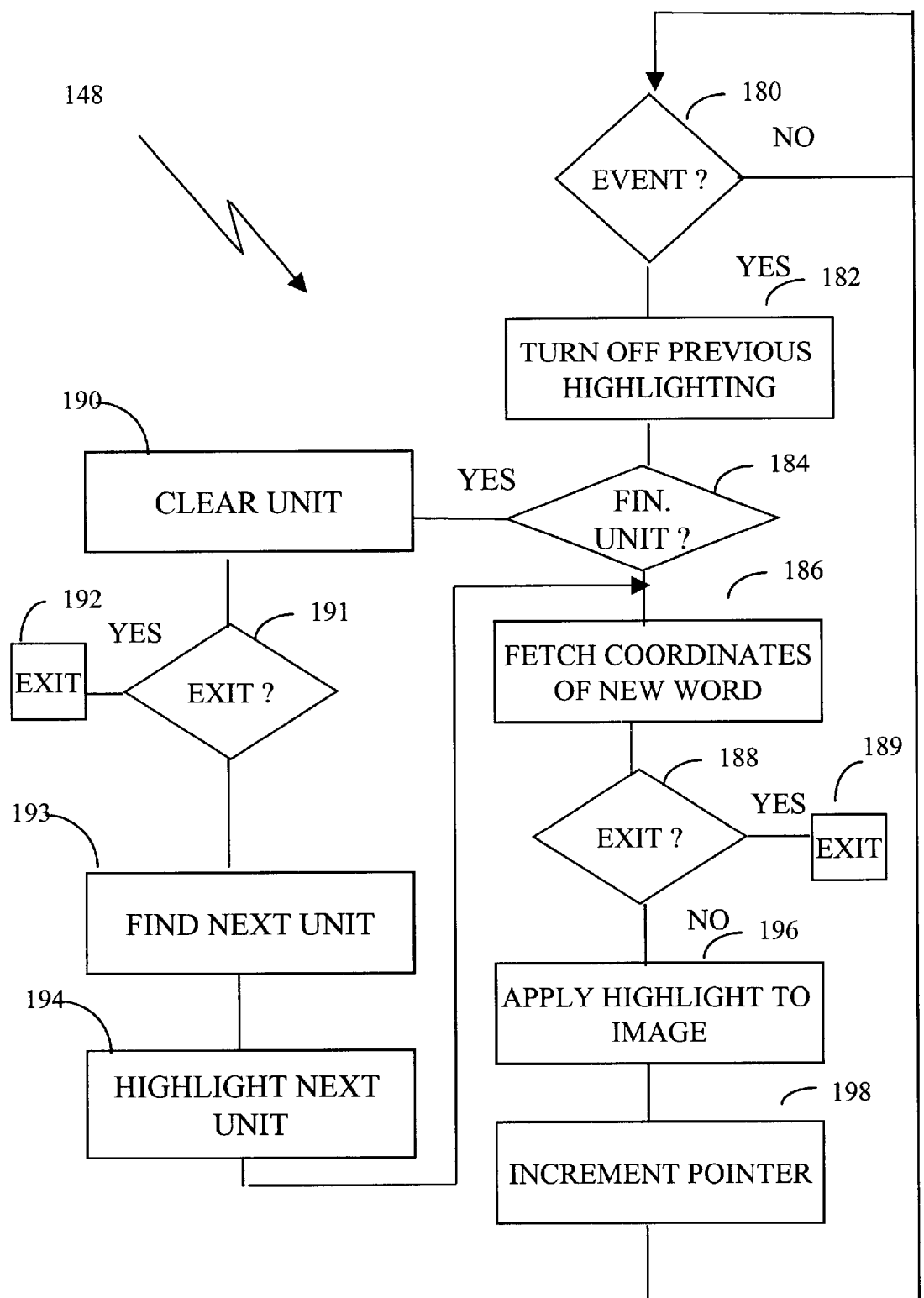
FIG. 16 is a flow chart showing steps used to highlight a selected word for use in the process described in conjunction with FIG. 14B.

Referring now to FIG. 16, the highlighting process 148 is shown to include a step 180 in which an event is awaited by the software 148. The event is typically an operating system interrupt-type driven operation that indicates any one of a number of operations such as a user of the reading machine 10 initiating speech synthesis of a word, sentence or paragraph. The highlighting process 148 remains in that state until an event occurs. When an event occurs all previous highlighting is turned off at step 182. The previous highlighting is turned off by sending a message (not shown) to the display system 138 causing the display system to remove the highlighting. At step 184 the highlighting process checks whether a unit of text has been completed. For example, a unit can be a word, line, sentence, or a paragraph for example, as selected by the user.

If a unit of text has been completed, then highlighting of the unit is also turned off at step 190. The software checks for an exit condition at step 191 after the coordinates have been fetched. An exit condition as shown in step 191 can be any one of a number of occurrences such as reaching the last word in the array of OCR data structures 35 or a user command to stop coming from the keyboard 18 or other input device. If an exit condition has occurred at step 191, the routine 148 exits to step 192.

If an exit condition has not occurred, the next unit is determined at step 193. The next unit of text is determined by using standard parsing techniques on the array of OCR text structures 35. Thus, the next unit is determined by looking for periods for example to demarcate the end of sentences, and indents and blank lines to look for paragraphs. In addition, changes in the Y coordinate can be used to give hints about sentences and lines. Other document structure features can also be used. The next unit is highlighted at step 194 by instructing the display system software 38 (FIG. 2) to apply a transparent color to the selected next unit. This is a first level of highlighting provided on a unit of image representation of the scanned document. Control transfers back to step 186.

At step 186 which is arrived at directly from step 184 or from step 192, the coordinates of the next word that is to be synthesized and highlighted are fetched. The software checks for an exit condition at step 188 after the coordinates have been fetched. An exit condition as shown in step 188 can be any one of a number of conditions such as reaching the last word in the array of OCR data structures 135 or a user command to stop provided from the keyboard 18 or other input device. If an exit condition has occurred at step 188, the routine 148 exits to step 189. Otherwise, at step 196 a second highlight is applied to the image, here preferably with a different transparent color and applied only to the word which is to be synthesized by the speech synthesizer 152. The pointer to the next word in the data structure 35 is then incremented at step 198 to obtain the next word. The second highlighting is provided by sending a message to display system software 38 containing the positional information retrieved from the data structure. This process continues until an exit condition occurs at step 188.

It should be noted that the single and the dual highlighting above was described as applying two distinct, transparent colors to selected image representations of the displayed document. Alternatively, however other highlighting indicia can be used such as bold text, font style or size changes, italics, boxing in selected text, and underlining. In addition, combinations of these other indicia with or without colors could be used.

Referring now particularly to FIGS. 17–20, a preferred format for the data structure 135 provided by the OCR step 34 (FIG.2) is shown. The data structure 135 is hierarchically organized. At the top of the data structure is a page, data structure 210. The page includes pointers 210*a*–210*e* to each one of a plurality of regions 220. A region is a rectangular shaped area that is comprised of one or more rectangular lines of text. If there are multiple line of text in a region, the lines do not overlap in the vertical direction. That is, starting with the top line, the bottom of each line is above the top of the next line. Here the regions may include headers, titles, columns and so forth. The headers may or may not straddle more than one column and so forth. The regions likewise include a plurality of pointers 220*a*–220*e* to each one of corresponding lines 230 shown in the data structure 230. The lines correspondingly have pointers 230*a*–230*e* to each of the words contained within the line.

Figure 18:
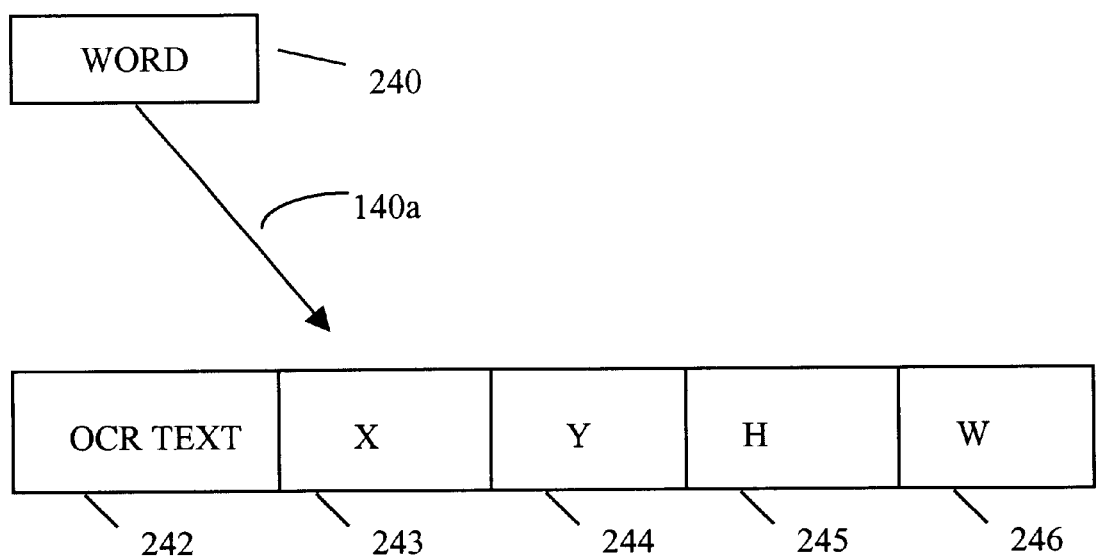
FIGS. 18–20 are diagrammatical views of detailed portions of the data structure of FIG. 17.
Figure 19:
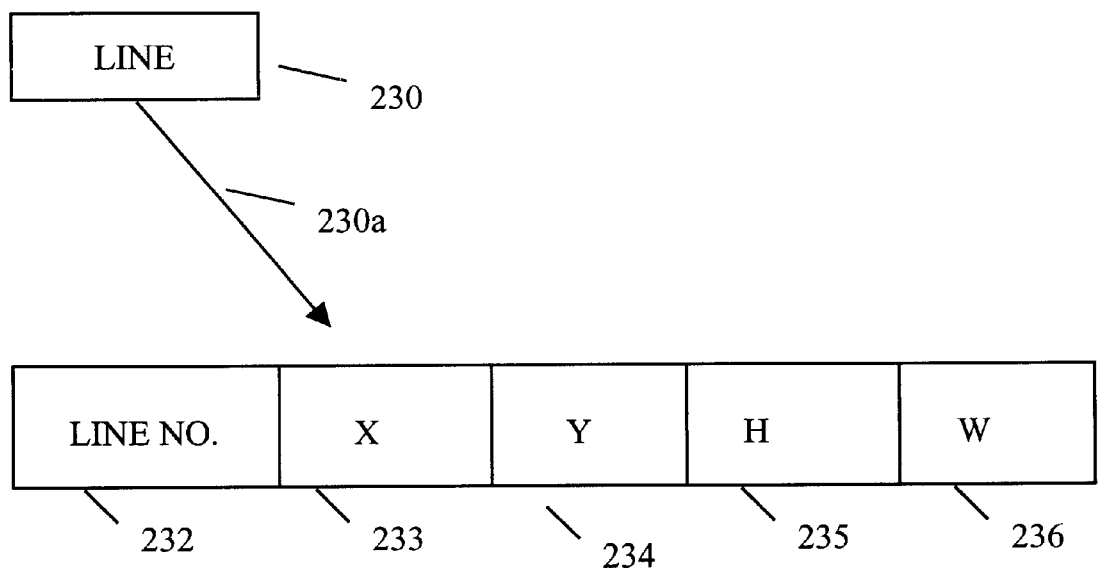
Figure 20:
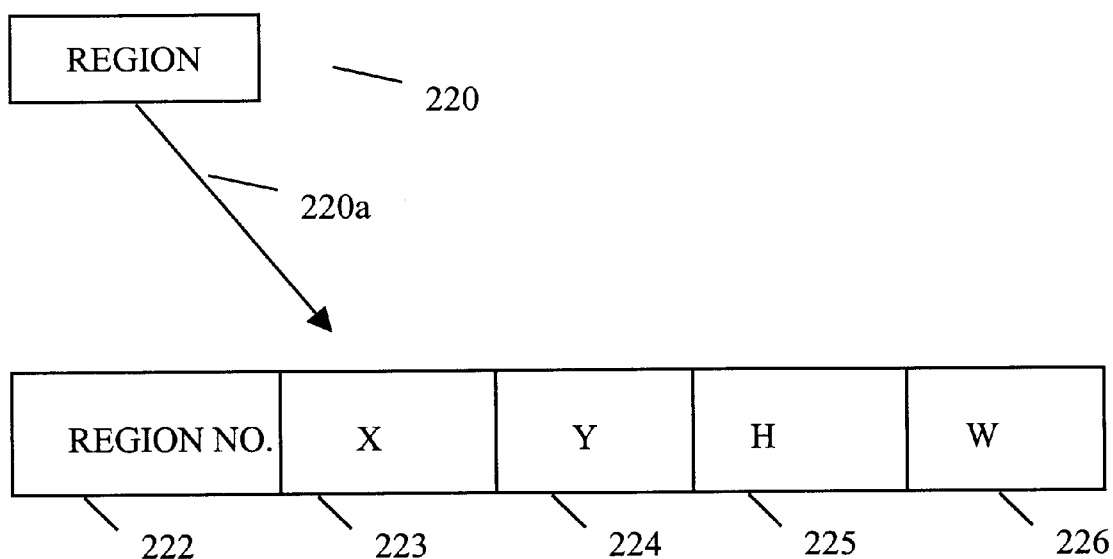

As shown in conjunction with FIGS. 18–20, the detail structure of items 240, 230 and 220 include a plurality of fields. Thus, for example, FIG. 18 for the word includes the text field 242 which has the OCR generated text and has fields 243 and 244 which provide rectangular coordinate information x and y, respectively, as well as fields 245 and 146 which provide here height and width information. Similar data are provided for the lines as shown in FIG. 19 as well as regions as shown in FIG. 20.

Now to be described will be a preferred method 146' to determining the nearest word associated with the position of a mouse or other pointing device. This approach is particularly advantageous for those situations where dragging operations of a mouse are performed. The image may not provide an exact correspondence to the text as determined by the OCR recognition system. Also sometimes incorrect text is selected because the user does not precisely place the mouse or other pointing device directly on the desired item in the image. Also, when the pointer is positioned in the white space between lines, or in the white space to the left or right of lines, choosing the closest word to the pointer will not always give the result that a computer user would normally expect, based on the behavior of mouse selection on standard computer text displays. Moreover, minor misalignments may also occur between the image as displayed on the display and as provided by the OCR text file.

Figure 22:
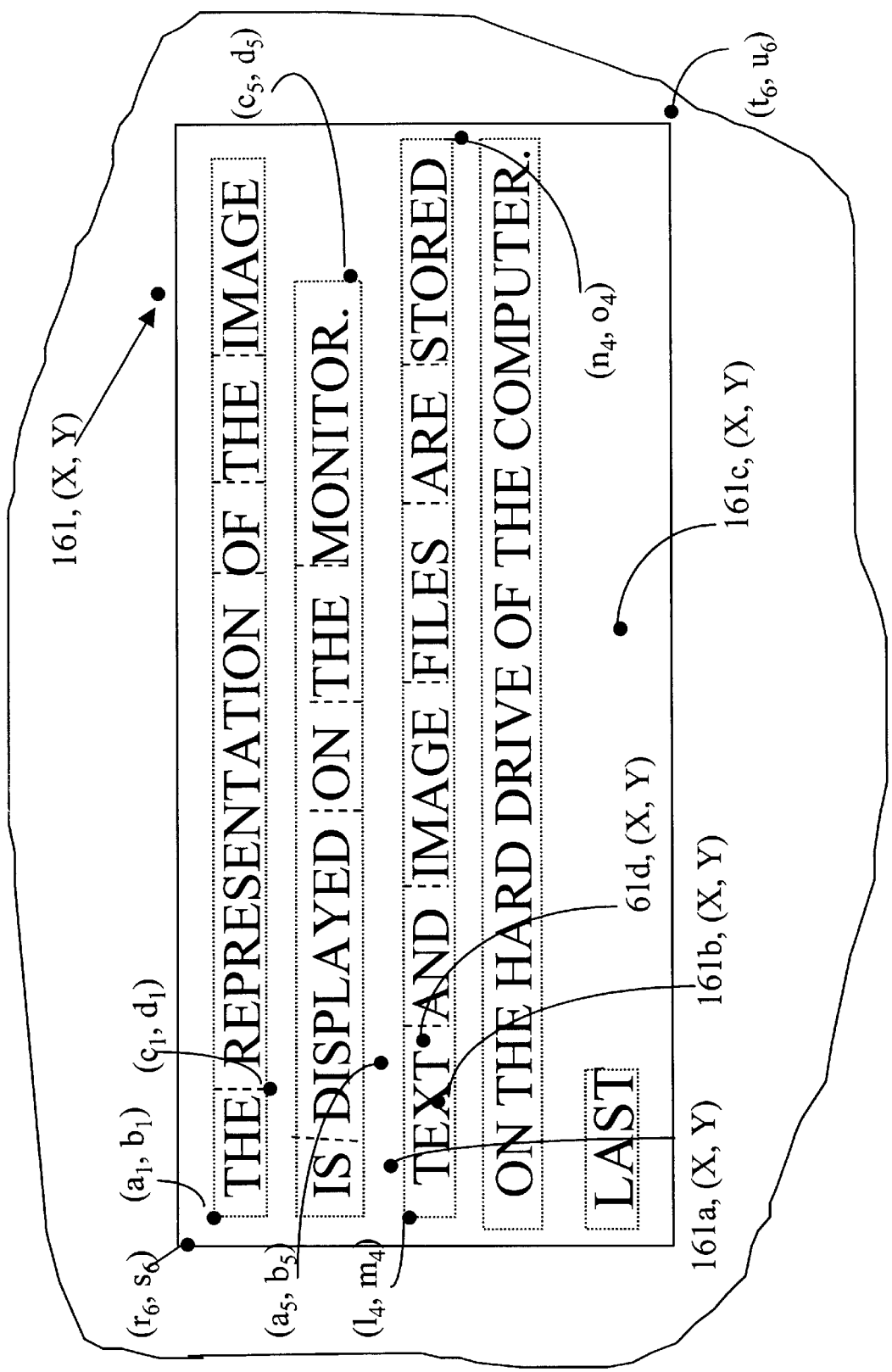
FIG. 22 is a pictorial illustration of a portion of an image representation of text displayed on a monitor useful in understanding the process of FIGS. 10A–10C.

For example, consider point 161*c* on FIG. 22. In the method 146 previously described, the closest word, which is "OF" in the previous line, will be chosen as the selected word. But on standard computer displays the point of selection would be after the word "LAST".

Figure 21A:
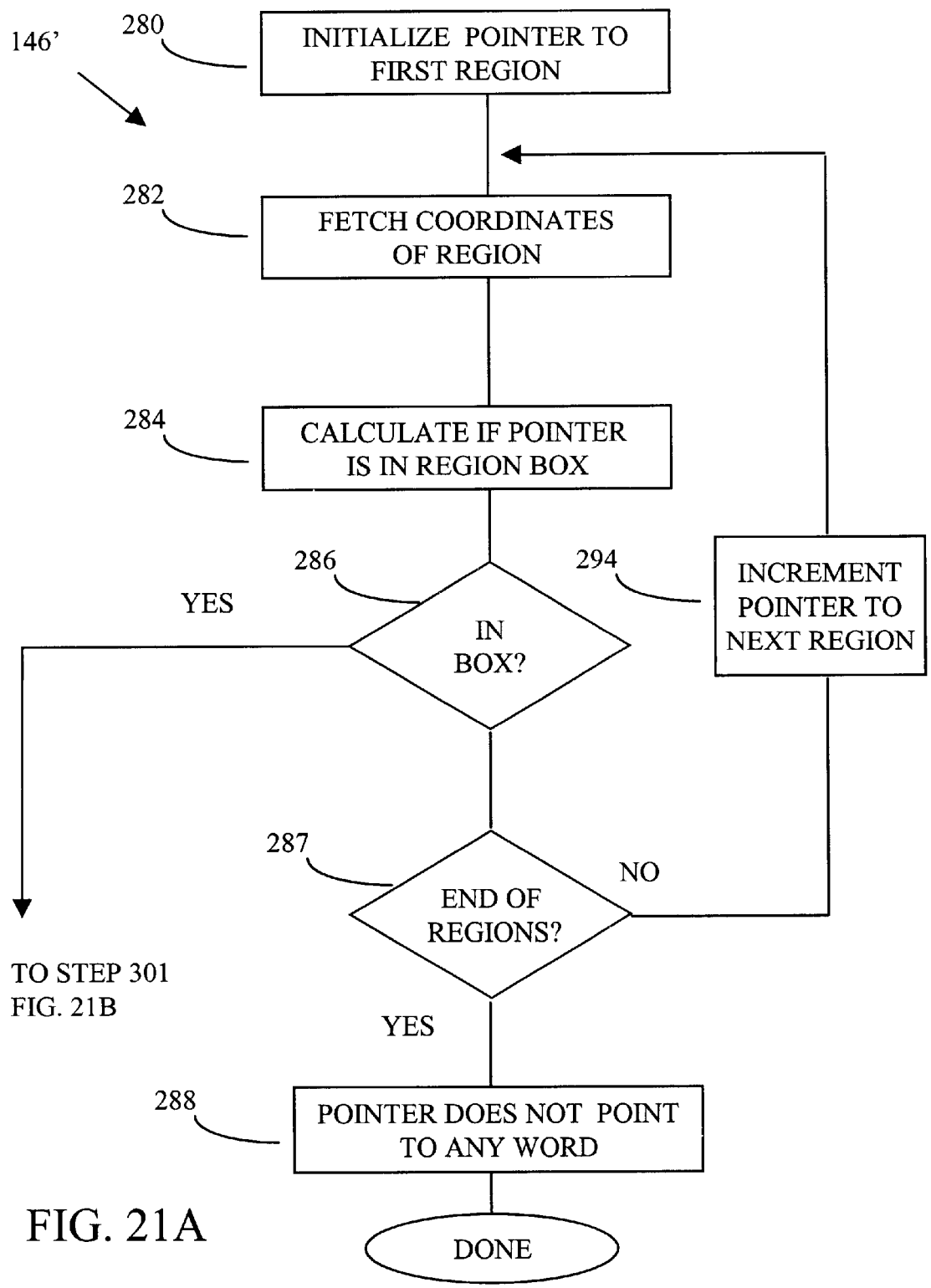
FIGS. 21A–21C are flow charts of an alternative embodiment for determining the nearest word.
Figure 21B:
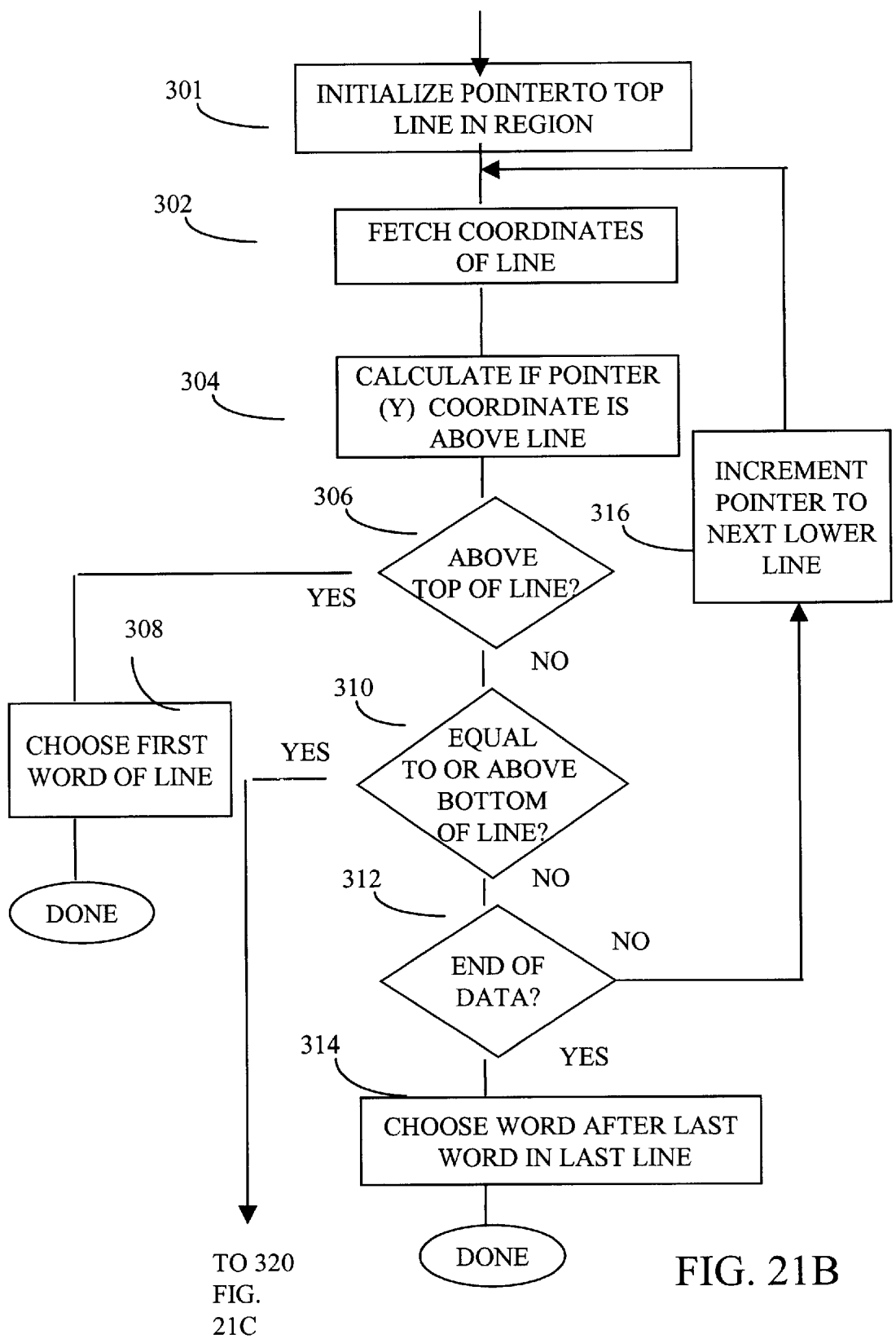
Figure 21C:
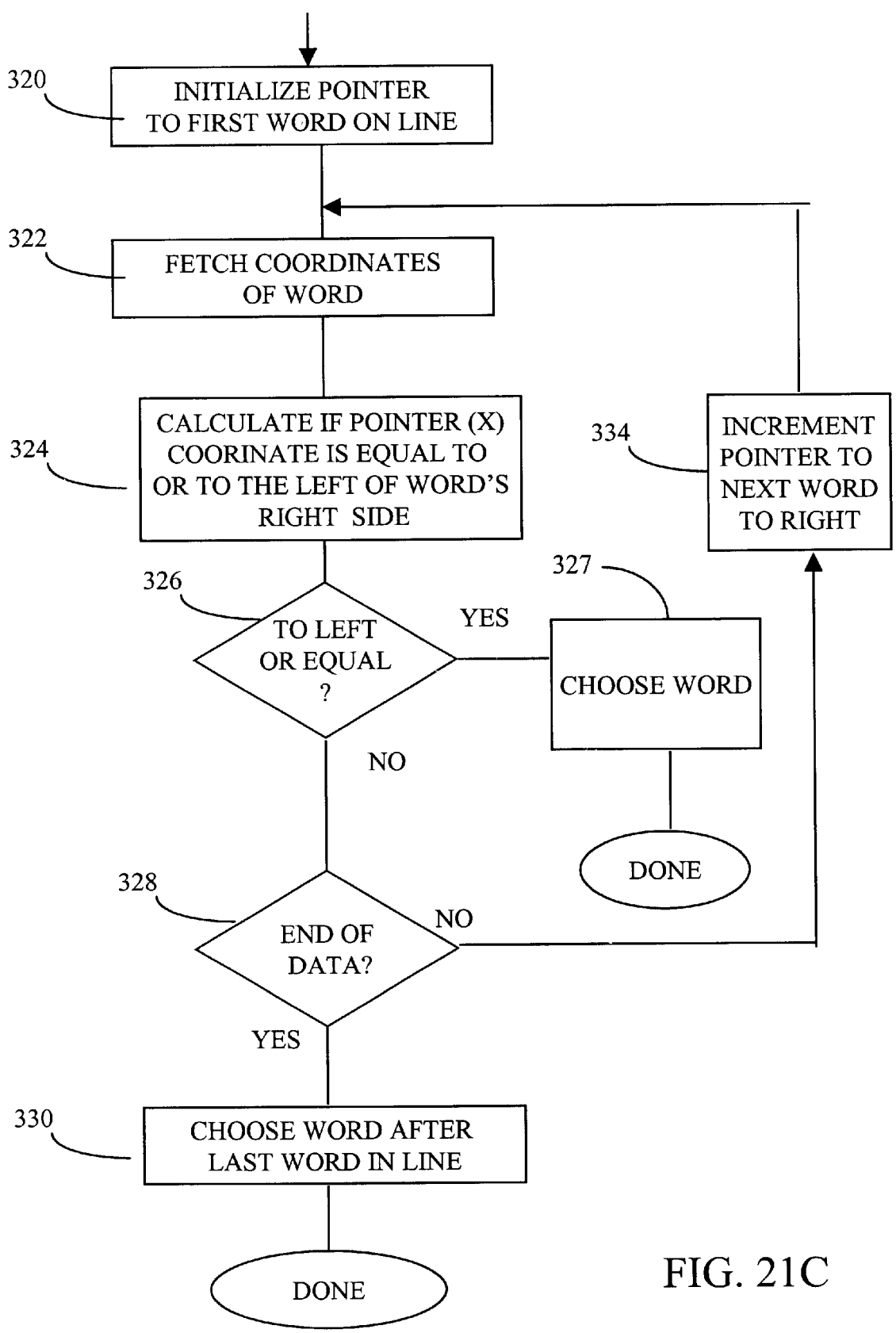

The approach as shown in conjunction with FIGS. 21A–21C will tend to mitigate some of these differences.

Referring now to FIG. 21A, pointers are again initialized to a first one of the regions, as shown by step 280 and the coordinates of the region's boundary box are fetched at step 182 from the data structure 220. The position (X, Y) of the pointer is calculated to determine whether or not it falls within a box defining a region.

To further illustrate this process, reference is also made to FIG. 22 which shows a sample region containing a plurality of lines of image text and boxes illustrated about the region, lines and word. Also three sample positions 161, 161*a*, 161*b* of the pointing device (not shown) are illustrated. The calculation for a region is performed in a similar manner as for calculating a box for a word described in conjunction with FIGS. 15A to 15C except that the positional information contained within the region data structure 220 is used to determine a box or other boundary associated with the region. Coordinates $(r_6, s_6)$ and $(t_6, u_6)$ denote the imaginary box about the illustrated region in FIG. 22. If at step 286 it is determined that the coordinates of the pointer fall within the box (as 161 and 161*a*–161*d*, FIG. 11), then the process branches to determine the nearest line in step 301 (FIG. 10B). Otherwise processing continues to step 287 to determine whether or not the process has reached the last region in the region data structure 220. If it has not reached the last structure the pointer is incremented in step 294 point to the next region in the data structure 120. If the process 146' has reached the last structure hence the coordinates of the pointer device do not point to any word, as 161, (FIG. 22). Therefore, a previously determined word is used, and the process exits.

If at step 286 it was determined that the coordinates fall within a region's box, then at step 301 a similar process is used to determine the nearest line except that the line data from the data structure 230 (FIG. 8) is used for positional information and index information such as coordinates ($l_4$, $m_4$) and ($n_4, o_4$) . Again for each line within the particular region, positional information is used to determine whether the coordinates of the pointing device are within a box defined about the line by the positional information associated with the line. If the coordinates of the positioning device fall above the box associated with the line as point 161a, then the software will choose the first word of the line here the word "TEXT". If the coordinates fall above the bottom of the line box as point 61b, then the software branches to step 320.

As shown in conjunction with FIG. 21B, the software initializes a pointer to the top line in the region (at step 301) and fetches the coordinates of the line at step 302. The coordinates which are fetched correspond to the top and bottom coordinates of an imaginary box positioned about the line. At step 304 the software determines whether the Y coordinate of the pointing device is above the line. This is accomplished by comparing the value of the Y coordinate of the pointing device to the Y coordinate ($m_4$) of the uppermost point defining the box about the line, as shown for point 161b. If at step 306 it is determined that the Y coordinate is above the box defined about the line, the software chooses the first word on line step 308 and is done. Otherwise, the software determines whether the Y coordinate is above the bottom of the box defining the line by using a similar approach as for the top of the line except using, for example, the coordinate ($0_4$). If it is determined that the Y coordinate is equal to or above the bottom of the box defining the line, as point 61b then the software branches to step 320 (FIG. 10C).

The X coordinate of the pointer is already known to be in the region and is not checked. This allows for short lines to be detected. Lines are often shorter than the width of the region. For example, short lines may occur at the beginning and end of paragraphs or in text that is not justified to form a straight right margin. Otherwise, it continues to step 312 where it is determined whether the current line is the last line in the data structure 230. If it is not the last line in data structure 230, the pointer is incremented at step 316 to point to the next lower line in the region. If it is the last line in the data structure 230 and the Y coordinate was not above the top of the line nor above the bottom of the line, the software chooses at step 314 the word after the word in the last line as for point 161c and is done.

Referring now to FIG. 21C, pointers are again initialized to a first one of the words on a line, as shown by step 320 and the coordinates of the word are fetched at step 322 from the data structure 240. The position X of the pointer is calculated to determine whether or not it falls at or to the left of the current word's right side at step 324 as for point 161a. This calculation is performed by comparing the X value of the pointer coordinate to the X value of the right side of the box defined about the word here coordinate as of point ($a_5,b_5$). If the value of the X coordinate for the box is less than or equal to that of the X coordinate of the pointing device, then the pointing device is considered pointing to the left side of the word's right side. At step 326 it is determined whether the pointer points to the left side of the word's right side. If it does, the particular word "TEXT" is chosen for point 161d at step 327 and the process is done. Otherwise, at step 328, the process determines whether or not it has reached the last word in the data structure 240. If it has not reached the last word in the data structure 240 the pointer is incremented at step 334 to point to the next word to the right. If it has reached the last word in the data structure 240, the software at step 330 will choose the word after the last word in the line (not illustrated) and the process is done.

The chosen word is forwarded on to steps 148 of FIG. 3. In this manner double highlighting, as described in conjunction with FIG. 16, and speech synthesis as described above are performed on the word chosen by this process.

Having described preferred embodiments of the invention it will be noted that other embodiments incorporating their concepts may be used. Accordingly, it is felt that the invention should not be limited to the disclosed embodiments but rather should only be limited by the spirit and scope of the appended claims.

What is claimed is:

1. A computer program product for compressing data files representative of an image document having color information and/or graphical information, said software product disposed on a computer readable medium comprising instructions for causing a computer to:

provide a first image file resolution of said document at a first and a second image file at a second resolution of said document with said-second resolution being lower than said first resolution;

process the first image file to convert the first image file into a text file representation of the document;

compress said text file representation of the document to provide a first compressed file;

process said second file to extract information from the image representation of the document corresponding to color information and graphics information;

compress the second file using a second compression technique to provide a second compressed file containing information corresponding to the image;

store said first and second compressed files and color information to provide a composite compressed file corresponding to the document;

scan the document at a first resolution to provide said first image file at said first resolution and scan the document at a second resolution to provide said second image file at said second resolution;

determine the foreground color corresponding to colors associated with text positions of the document; and determine the foreground colors by causing the computer to retrieve a plurality of samples of blocks of pixels from the low resolution image representation of the document and from each one of said samples of pixels find a pixel corresponding to the minimum and maximum intensity of -the pixels in the block;

and for each one of said samples calculate a threshold value representative of the document by averaging the minimum and maximum intensities for each of the blocks;

determine a color associated with each one of the blocks and the width of intensity of each one of the blocks and provide a data structure having an entry for each one of said blocks corresponding to a foreground color.

2. A computer system including a computer software product for compressing data files representative of an image document, said document including color information and/or graphical information, said computer system including:

a processor to execute said software instructions;

a memory storing said software program;

a display which displays representations of said document;

said software product disposed on a computer readable medium comprising instructions for causing a computer to:

provide a first image file of said document at a first resolution and a second image file of said document at a second resolution with said second resolution being lower than said first resolution;

process the first image file to convert the first image file into a text file representation of the document;

compress said text file representation of the document to provide a first compressed file;

process said second file to extract information from the image representation of the document corresponding to color information and graphics information;

compress the second file using a second compression technique to provide a second compressed file containing information corresponding to the image;

store said first and second compressed files and said color information to provide a composite compressed file of the document;

scan the document at a first resolution to provide said first image file at said first resolution and scan the document at a second resolution to provide said second image file at said second resolution;

determine foreground color corresponding to colors associated with text positions of the document; and determine the foreground colors by causing the computer to retrieve a plurality of samples of groups of pixels from the low resolution image representation of a document and from each one of said samples of pixels find a pixel corresponding to the minimum and maximum intensity of the pixels in the sample; and for each one of said samples calculate a threshold value representative of the document by averaging the minimum and maximum intensities for each of the blocks;

determine a color associated with each one of the blocks and the width of intensity of each one of the blocks; and provide a color data structure having an entry for each one of said blocks corresponding to a foreground color.

3. A computer program product for decompressing a file containing image information and text information, said program residing on a computer readable medium comprising instructions for causing a computer to:

decompress the file containing image information and text information into an image file and a text file;

allocate a target bit map to represent the decompressed file;

insert the decompressed image information into the target bit map at locations specified by information contained in said file containing image information and text information;

insert text information into said target bit map in accordance with positional information provided from the decompressed text file; and fill the target output bit map with a color corresponding to a dominant background color provided from color information in the file.

4. The computer program product as recited in conjunction with claim 3 further comprising instructions for causing a computer to apply a color to the text information in the target bit map in accordance with said color information provided from said file.

5. A method of compressing an image representation of a document having color portions and text portions comprises the steps of:

scanning a document to provide a first file at a first resolution and a second file at a second, lower resolution;

converting the first file into a text file;

applying an auto-rotate filter to the first file to correct said file for errors;

converting said high resolution image file into an optical character recognition file having text information and positional information corresponding to the text information on the image document;

masking portions of said optical character recognition file corresponding to portions of said document representing graphical information associated with the document; and compressing the unmasked portions of said optical character recognition file to provide a compressed text file;

applying a rotate filter to the second file to correct errors in said second file;

determining from said second file foreground colors associated with each of the sections of said document and background colors associated with each portion of said document;

determining from said background colors a dominant background color that best represents the background color of the document;

masking portions of said document not corresponding to the graphical portions of the document; and compressing said unmasked portions to provide a second file corresponding to graphical portions of the document and storing said color information, and said first and second files as a composite file.

6. A computer system including a computer software product for compressing data files representative of an image document, said document including color information and/or graphical information, said computer system including:

a processor to execute said software instructions;

a memory storing said software program;

a display which displays representations of said document;

said software product disposed on a computer readable medium comprising instructions for causing a computer to:

provide a first image file of said document at a first resolution and a second image file of said document at a second resolution with said second resolution being lower than said first resolution;

process the first image file to convert the first image file into a text file representation of the document;

compress said text file representation of the document to provide a first compressed file;

process said second file to extract information from the image representation of the document corresponding to color information and graphics information;

compress the second file using a second compression technique to provide a second compressed file containing information corresponding to the image;

store said first and second compressed files and said color information to provide a composite compressed file of the document; and determine a dominant background color in the file.

7. A computer system including computer software product for compressing data files representative of an image document, said document including color information and/or graphical information, said computer system including:

a processor to execute said software instructions;

a memory storing said software program;

a display which displays representations of said document;

said software product disposed on a computer readable medium comprising instructions for causing a computer to:

provide a first image file of said document at a first resolution and a second image file of said document at a second resolution with said second resolution being lower than said first resolution;

process the first image file to convert the first image file into a text file representation of the document;

compress said text file representation of the document to provide a first compressed file;

process said second file to extract information from the image representation of the document corresponding to color information and graphics information;

compress the second file using a second compression technique to provide a second compressed file containing information corresponding to the image;

store said first and second compressed files and said color information to provide a composite compressed file of the document; and retrieve background color information associating a background color with each one of a plurality of samples of pixels representing the document;

filter said background colors to provide a target number of colors to represent the background colors;

apply a median cut analysis to the background color samples to filter said background samples into one of a plurality of boxes corresponding to said target number of colors;

sort said boxes by increasing volume;

sort a first portion of said boxes having the smallest amount of volume by decreasing intensity; and determine the dominant background color as a color to represent the background of the document by the box having the lowest intensity.

* * * * *